United States Patent
Tandon et al.

(10) Patent No.: US 11,900,165 B2
(45) Date of Patent: Feb. 13, 2024

(54) HARDWARE ACCELERATION FOR FUNCTION PROCESSING

(71) Applicant: Microsoft Technology Licensing, LLC, Redmond, WA (US)

(72) Inventors: Prateek Tandon, Issaquah, WA (US); Brian Jacob Corell, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/586,434

(22) Filed: Jan. 27, 2022

(65) Prior Publication Data
US 2022/0147396 A1 May 12, 2022

Related U.S. Application Data

(62) Division of application No. 16/555,927, filed on Aug. 29, 2019, now Pat. No. 11,237,873.

(51) Int. Cl.
*G06F 9/46* (2006.01)
*G06F 9/50* (2006.01)
*G06F 9/38* (2018.01)
*G06F 9/48* (2006.01)
*G06F 13/362* (2006.01)

(52) U.S. Cl.
CPC .......... *G06F 9/5027* (2013.01); *G06F 9/3836* (2013.01); *G06F 9/4843* (2013.01); *G06F 13/3625* (2013.01)

(58) Field of Classification Search
CPC .... G06F 9/5027; G06F 9/3836; G06F 9/4843; G06F 13/3625
See application file for complete search history.

(56) References Cited

U.S. PATENT DOCUMENTS

| 9,577,829 B1* | 2/2017 | Roth | G06F 21/60 |
| 2005/0086359 A1* | 4/2005 | Banerjee | G06F 9/5027 709/232 |

OTHER PUBLICATIONS

Bertels et al., "Profiling, Compilation, and HDL Generation Within the hArtes Project", Jan. 2007, pp. 1-10.*
Jain, S., et al., "Speeding Up Program Execution Using Reconfigurable Hardware and a Hardware Function Library," VLSI Design, 1998 Proceedings, 1998 Eleventh International Conference, IEEE 1997/1998, pp. 400-405.*
"Notice of Allowance Issued in South Africa Patent Application No. 2022/00836", dated Feb. 24, 2023, 1 Page.

* cited by examiner

*Primary Examiner* — Gregory A Kessler
(74) *Attorney, Agent, or Firm* — Ray Quinney & Nebeker; Christopher Hallstrom

(57) ABSTRACT

A function processing service may receive a request to execute source code. The source code may include instructions to perform a function. The function processing service may determine whether at least one hardware acceleration condition has been satisfied for the function. If at least one hardware acceleration condition has been satisfied, the instructions in the source code may be translated into hardware-specific code corresponding to a hardware circuit. The hardware circuit may be configured based on the hardware-specific code, and the hardware circuit may perform the function. The function processing service may then provide the result obtained from the hardware circuit to the requesting entity.

20 Claims, 18 Drawing Sheets

HARDWARE ACCELERATION FOR FUNCTION PROCESSING

CROSS-REFERENCE TO RELATED APPLICATIONS

This application is a Divisional of U.S. application Ser. No. 16/555,927, filed on Aug. 29, 2019, now U.S. Pat. No. 11,237,873, the entirety of which is incorporated herein by reference.

BACKGROUND

Cloud computing is the delivery of computing services (e.g., servers, storage, databases, networking, software, analytics) over the Internet. Broadly speaking, a cloud computing system includes two sections, a front end and a back end, that are in electronic communication with one another via the Internet. The front end includes the interface that users encounter through a client device. The back end includes the resources that deliver cloud-computing services, including processors, memory, storage, and networking hardware. The back end of a cloud computing system typically includes one or more data centers, which may be located in different geographical areas. Each data center typically includes a large number (e.g., hundreds or thousands) of computing devices, which may be referred to as host machines.

Many different types of services may be provided by a cloud computing system. A function processing service is a cloud computing service that allows users to execute source code without the complexity of building and maintaining the infrastructure that is typically associated with developing and launching an application. A function processing service automatically manages the computing resources that are required to execute the source code. Therefore, a function processing service makes it possible for software developers to execute source code without having to worry about provisioning or managing servers.

As the name "function processing" implies, a function processing service may be utilized to execute source code that includes instructions to perform one or more functions. Function processing is sometimes referred to as serverless computing or function as a service (FaaS).

As function processing services grow in popularity, the source code that is being executed is growing more complex and data intensive. For instance, machine learning or artificial intelligence applications can utilize data intensive scripts that process massive amounts of data. These data intensive scripts can greatly increase processing time and consume significant amounts of computing resources. Users, however, expect function processing services to run efficiently and quickly. Accordingly, benefits may be realized by techniques for enhancing the efficiency of a function processing service in a cloud computing system.

SUMMARY

In accordance with one aspect of the present disclosure, a computer-implemented method is disclosed that includes receiving, at a function processing service, a request to execute source code. The request is received from a requesting entity. The source code includes instructions to perform a function. The method further includes determining that a hardware acceleration condition has been satisfied for the function, translating the instructions in the source code into hardware-specific code corresponding to a hardware circuit, configuring the hardware circuit based on the hardware-specific code, causing the hardware circuit to perform the function, and providing a result obtained from the hardware circuit to the requesting entity.

As an example, the hardware circuit may include a field programmable gate array (FPGA), and the hardware-specific code may include hardware description language (HDL) code corresponding to the FPGA. As another example, the hardware circuit may include a graphics processing unit (GPU), and the hardware-specific code may include GPU code. As another example, the hardware circuit may include a digital signal processor (DSP), and the hardware-specific code may include DSP code. As another example, the hardware circuit may include an application specific integrated circuit (ASIC), and the hardware-specific code may include hardware description language (HDL) code.

Determining that the hardware acceleration condition has been satisfied may include counting a number of requests to perform the function that the function processing service receives within a time interval and determining that the number of requests exceeds a threshold value.

In some embodiments, the function may belong to a family of functions. In such embodiments, determining that the hardware acceleration condition has been satisfied may include counting a number of requests to perform any function within the family of functions that the function processing service receives within a time interval and determining that the number of requests exceeds a threshold value.

In some embodiments, determining that the hardware acceleration condition has been satisfied may include determining an estimated cost savings associated with performing the function via the hardware circuit compared to performing the function via a general-purpose processor and determining that the estimated cost savings exceeds a threshold value.

In some embodiments, determining that the hardware acceleration condition has been satisfied may include determining that the function is included in a function library and may further include adding new functions to the function library.

In accordance with another aspect of the present disclosure, a computer-implemented method is disclosed that includes determining that a hardware acceleration condition has been satisfied for a first function, configuring a hardware circuit to perform the first function, and adding the first function to a function library that is implemented in hardware circuits. The method further includes receiving, at a function processing service, a request to execute source code. The source code includes instructions to perform the first function. The method further includes causing the first function to be performed via the hardware circuit.

In some embodiments, the method may further include configuring the hardware circuit to perform a second function in parallel with the first function. The second function may be different from the first function. In other embodiments, the method may further include configuring the hardware circuit to perform a plurality of instances of the hardware circuit in parallel.

In accordance with another aspect of the present disclosure, a computer-implemented method includes analyzing first historical information related to a first plurality of requests received by a function processing service during a first time interval, configuring a set of hardware circuits to perform a first set of functions during the first time interval based on the first historical information, and analyzing second historical information related to a second plurality of requests received by the function processing service during a second time interval. The second time interval is different from the first time interval. The method further includes configuring the set of hardware circuits to perform a second set of functions during the second time interval based on the second historical information. The second set of functions is different from the first set of functions.

The method may further include receiving a first request to execute first source code. The first request may be received during the first time interval. The first source code may further include first instructions to perform a first function. The first set of functions may include the first function. The method may further include causing the first function to be performed via a first hardware circuit in the set of hardware circuits and receiving a second request to execute second source code. The second request may be received during the second time interval. The second source code may include second instructions to perform a second function. The second set of functions may include the second function performing the second function during the second time interval via a second hardware circuit in the set of hardware circuits.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
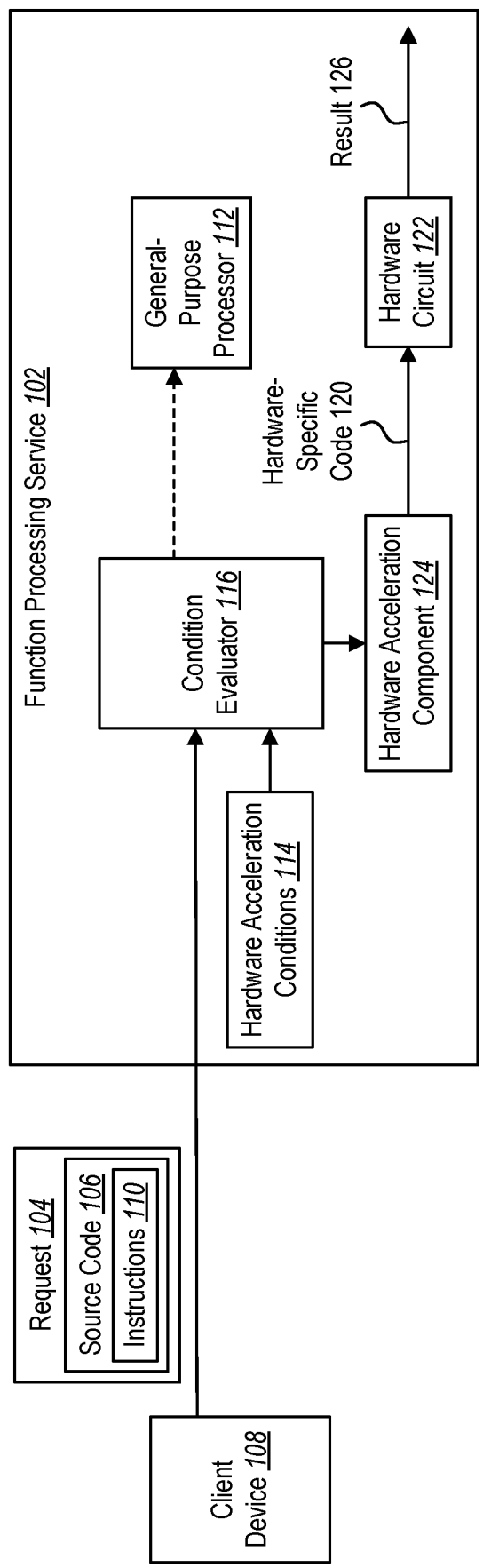
FIG. 1 illustrates an example of a function processing service that is configured to selectively utilize hardware acceleration in accordance with the present disclosure.

The present disclosure is generally related to enhancing the efficiency of a function processing service in a cloud computing system. In accordance with one aspect of the present disclosure, a function processing service may be configured to selectively utilize hardware acceleration. More specifically, a function processing service may be configured to utilize hardware acceleration to perform a function when a determination is made that it would be beneficial to do so. Such a determination may be made based on various factors, such as how frequently requests to perform the function are received, whether the speed of processing can be increased by a meaningful amount, and/or whether the cost of processing can be reduced by a meaningful amount.

In this context, the term "hardware acceleration" may refer to the use of a hardware circuit to perform a function, where the hardware circuit has been specifically designed or programmed to perform the function so that the function can be performed faster than if it were specified in software and performed on a general-purpose processor. The term "hardware circuit" may in general refer to any configuration of electrically or electromagnetically connected components or devices other than a general-purpose processor. A hardware circuit may be an integrated circuit. Some examples of hardware circuits that may be used in accordance with the present disclosure include field programmable gate arrays (FPGAs), graphics processing units (GPUs), digital signal processors (DSPs), and application specific integrated circuits (ASICs).

There are many different types of functions for which hardware acceleration may be beneficial. Some examples include data processing, compression or encryption, location tracking, video processing, financial transactions, log analysis, text processing, fast filtering of streaming data, web hosting, machine learning training (e.g., linear regression), machine learning inference (e.g., image recognition), signal processing (e.g., using a DSP), and so forth.

In some embodiments, one or more conditions may be defined that indicate when hardware acceleration should be used to perform a function. Such conditions may be referred to herein as hardware acceleration conditions. When a function processing service receives a request to execute source code that includes instructions to perform a function, the function processing service may determine whether any of the defined hardware acceleration conditions have been satisfied. If at least one hardware acceleration condition has been satisfied, then hardware acceleration may be utilized to perform the function.

In some embodiments, hardware acceleration may be performed automatically, without requiring the user to specifically request hardware acceleration or to provide hardware-specific code, such as register-transfer logic (RTL) code for an FPGA. For example, a user's request to perform a particular function may take the form of a request to execute source code. The source code is typically in a high-level programming language such as Java, C++, Python, or the like. A function processing system that receives such a request may automatically determine whether it would be beneficial to use hardware acceleration to perform the function. If it is determined that hardware acceleration would be beneficial, then the source code may be automatically translated into hardware-specific code, without requiring additional input from the user.

In some embodiments, before a function processing service uses hardware acceleration to perform a function, a user may be notified about the possibility of using hardware acceleration and given the opportunity to choose whether or not hardware acceleration can be performed.

FIG. 1 illustrates an example of a function processing service 102 that is configured to selectively utilize hardware acceleration in accordance with the present disclosure. The function processing service 102 is shown receiving a request 104 to perform a particular function. However, the request 104 is not a request to perform a function via a hardware circuit. Instead, the request 104 is to execute source code 106. The request 104 may be received from a client device 108. The source code 106 includes instructions 110 that, if executed by a general-purpose processor 112, cause a particular function to be performed.

In the depicted example, a plurality of hardware acceleration conditions 114 have been defined for the function processing service 102. In addition, the function processing service 102 includes a component that is configured to determine whether any of the hardware acceleration conditions 114 have been satisfied. This component may be referred to herein as a condition evaluator 116.

In response to receiving the request 104, the condition evaluator 116 determines whether any of the hardware acceleration conditions 114 have been satisfied with respect to the function that is specified by the instructions 110 in the source code 106. If none of the hardware acceleration conditions 114 have been satisfied, then the function processing service 102 fulfills the request 104 by causing the instructions 110 in the source code 106 to be executed by a general-purpose processor 112.

However, if at least one of the hardware acceleration conditions 114 has been satisfied, then hardware acceleration may be utilized to perform the function. The function processing service 102 includes a component that is configured to facilitate the use of hardware acceleration. This component may be referred to herein as a hardware acceleration component 124. The hardware acceleration component 124 may be configured to translate the instructions 110 in the source code 106 into hardware-specific code 120 corresponding to a hardware circuit 122. Once the hardware-specific code 120 has been generated, the hardware acceleration component 124 may then configure the hardware circuit 122 based on the hardware-specific code 120 and cause the hardware circuit 122 to perform the function. The hardware circuit 122 may then perform the function and generate a particular result 126. The function processing service 102 may then provide this result 126 to the requesting entity, which is the client device 108 in the depicted example.

There are many different types of hardware acceleration conditions that may be defined in accordance with the present disclosure. For example, a hardware acceleration condition related to a particular function may be based on how many requests to perform the function have been received. In some embodiments, a hardware acceleration condition may be defined in terms of a threshold value that indicates the minimum number of requests to perform a particular function that should be received in order to justify the use of hardware acceleration for that function. The number of such requests that are received by the function processing service may then be counted and compared with the threshold value. If the number of such requests that are received exceeds the threshold value, then the hardware acceleration condition is satisfied, and hardware acceleration may be used to perform the function.

Figure 2:
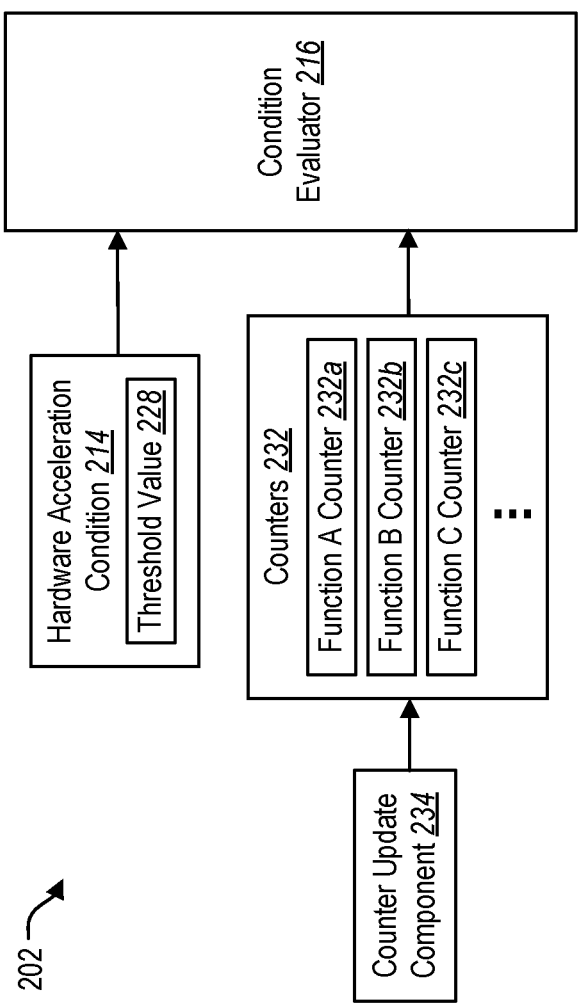
FIG. 2 illustrates aspects of a function processing service that implements a hardware acceleration condition based on the number of requests to perform a function that have been received.

FIG. 2 illustrates aspects of a function processing service 202 that implements a hardware acceleration condition 214 based on the number of requests to perform a function that have been received.

The function processing service 202 may define a threshold value 228 that indicates the minimum number of requests to perform a particular function that should be received in order to justify the use of hardware acceleration for the function. The function processing service 202 may also keep track of the number of requests that have been received in connection with various functions. In the depicted embodiment, the function processing service 202 utilizes counters 232 corresponding to a plurality of functions that may be performed by the function processing service 202. FIG. 2 shows the function processing service 202 with a counter 232a indicating the number of requests that have been received to perform function A, a counter 232b indicating the number of requests that have been received to perform function B, and a counter 232c indicating the number of requests that have been received to perform function C.

The function processing service 202 may also include a component that is configured to update the counters 232 when requests to perform particular functions are received. This component may be referred to herein as a counter update component 234. When the function processing service 202 receives a request to perform a particular function (e.g., function A), the counter update component 234 may increment the corresponding counter (e.g., the function A counter 232a).

The function processing service 202 includes a condition evaluator 216 that is configured to determine whether the hardware acceleration condition 214 has been satisfied. The hardware acceleration condition 214 may be defined such that hardware acceleration is performed for a particular function if the value of the corresponding counter 232 exceeds the defined threshold value 228. Thus, when the function processing service 202 receives a request to perform a particular function (e.g., function A), the condition evaluator 216 may compare the value of the counter 232 corresponding to that function (e.g., the function A counter 232a) to the threshold value 228. If the value of the corresponding counter 232 exceeds the threshold value 228, the condition evaluator 216 may conclude that the hardware acceleration condition 214 has been satisfied and hardware acceleration may be used to perform the function. If, however, the value of the corresponding counter 232 is less than the threshold value 228, the condition evaluator 216 may conclude that the hardware acceleration condition 214 has not been satisfied. If there is not another hardware acceleration condition that has been satisfied for the function, then the function may be carried out using a general-purpose processor.

In some embodiments, a hardware acceleration condition may be defined such that hardware acceleration is performed for a particular function only if a certain number of requests to perform the function have been received within a defined time interval. In such embodiments, a function processing service may define both a threshold value and a relevant time interval. The threshold value may indicate the minimum number of requests to perform a particular function that should be received within the time interval in order to justify the use of hardware acceleration for a function.

For example, suppose that the threshold value is N (where N represents a positive integer), and the time interval is one week. In this case, if more than N requests to perform a particular function are received within the same week, then the hardware acceleration condition may be deemed to be satisfied and hardware acceleration may be performed. However, if more than N requests to perform a particular function are received but not within the same week, then it may be concluded that the hardware acceleration condition has not been satisfied.

There are various ways that such a temporal constraint may be implemented. In some embodiments, a function processing service may utilize counters corresponding to functions that may be performed by the function processing service, and the counters may be periodically reset based on the time interval that has been defined for the hardware acceleration condition. For example, if the defined time interval is one week, then the counters may be reset once each week.

In some embodiments, a function processing service may store historical information that includes information about previous requests that have been received. The information that is stored about a particular request may include information identifying the requested function, as well as a time stamp indicating when the request was received. In such embodiments, the stored historical information may be queried to determine how many requests to perform a particular function have been received during a certain period of time. If, for example, a request to perform a particular function is received at time t, the historical information may be queried to determine how many requests to perform that function have been received during a time period corresponding to the defined time interval (e.g., the defined time interval immediately preceding time t). The result of that query may then be compared with the threshold value to determine whether the hardware acceleration condition is satisfied.

Figure 3:
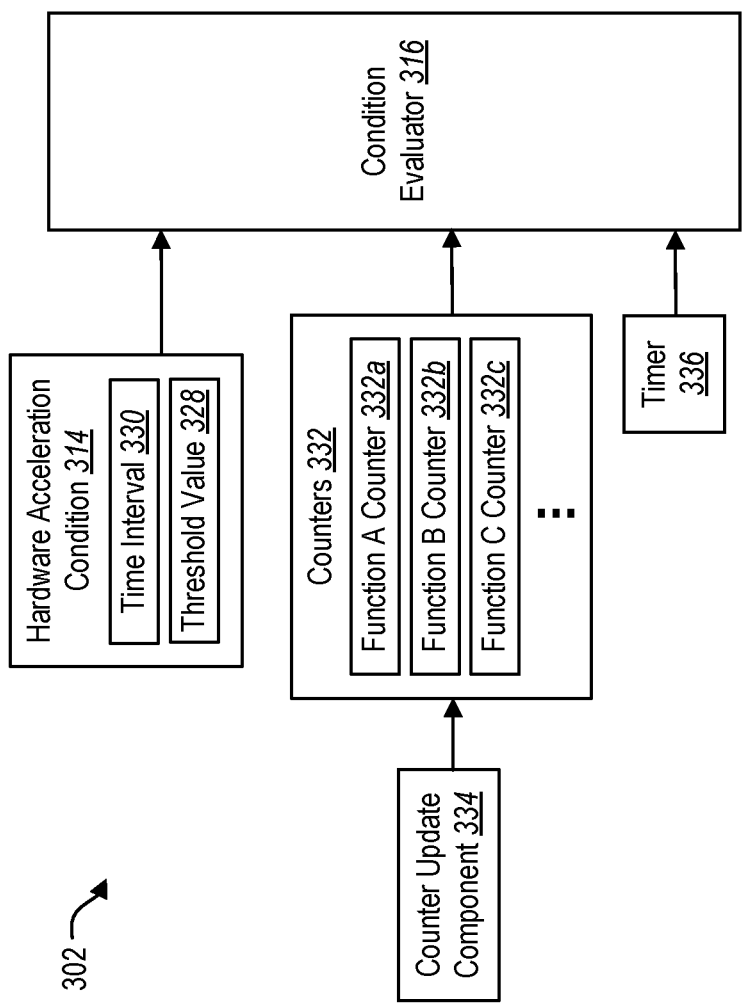
FIG. 3 illustrates aspects of a function processing service that implements a hardware acceleration condition based on the number of requests that have been received within a defined time interval, where counters are used to keep track of the number of requests that have been received in connection with various functions.

FIG. 3 illustrates aspects of a function processing service 302 that implements a hardware acceleration condition 314 based on the number of requests that have been received within a defined time interval 330, where counters 332 are used to keep track of the number of requests that have been received in connection with various functions. FIG. 3 shows the function processing service 302 with a counter 332a indicating the number of requests that have been received to perform function A, a counter 332b indicating the number of requests that have been received to perform function B, and a counter 332c indicating the number of requests that have been received to perform function C. The function processing service 302 includes a counter update component 334 that is configured to update the counters 332 when requests to perform particular functions are received.

In the depicted embodiment, the threshold value 328 indicates the minimum number of requests to perform a particular function that should be received within the defined time interval 330 in order to justify the use of hardware acceleration for the function. The counters 332 may be periodically reset based on the time interval 330 that has been defined for the hardware acceleration condition 314.

The function processing service 302 may utilize a timer 336 to keep track of when the counters 332 should be reset. In some embodiments, the timer 336 may be a countdown timer, and the value of the countdown timer may be set to the defined time interval 330. The counters 332 may be reset whenever the countdown timer expires. Alternatively, the timer 336 may be a countup timer, and the counters 332 may be reset whenever the countup timer reaches a value that is equivalent to the defined time interval 330.

When the function processing service 302 receives a request to perform a particular function (e.g., function A), a condition evaluator 316 may compare the value of the counter 332 corresponding to that function (e.g., the function A counter 332a) to the threshold value 328. If the value of the corresponding counter 332 exceeds the threshold value 328, hardware acceleration may be used to perform the function. If, however, the value of the corresponding counter 332 is less than the threshold value 328, the function may be carried out using a general-purpose processor.

Figure 4:
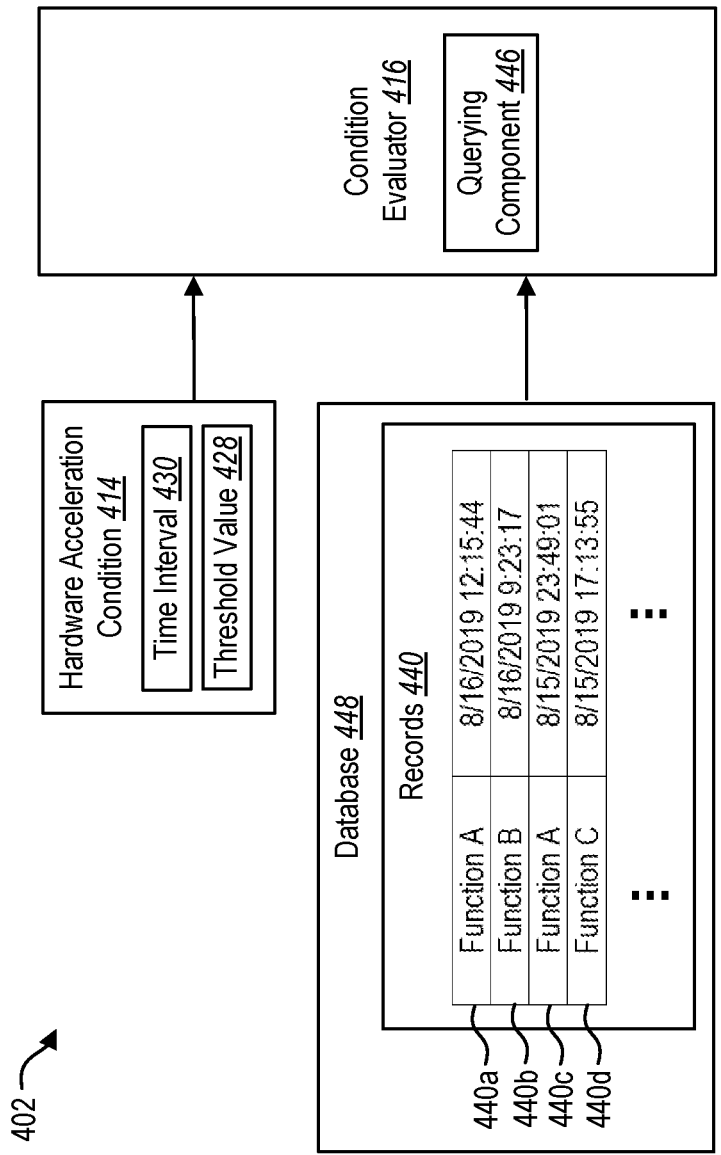
FIG. 4 illustrates aspects of a function processing service that implements a hardware acceleration condition based on the number of requests that have been received within a defined time interval, where historical information is stored about previous requests that have been received.

FIG. 4 illustrates aspects of a function processing service 402 that implements a hardware acceleration condition 414 based on the number of requests that have been received within a defined time interval 430, where historical information is stored about previous requests that have been received.

As before, the function processing service 402 may define a threshold value 428 that indicates the minimum number of requests to perform a particular function that should be received within a defined time interval 430 in order to justify the use of hardware acceleration for the function.

The historical information may be stored in a database 448. The historical information may include a plurality of records 440, and each record 440 may correspond to a particular request that the function processing service 402 has received. More specifically, each record 440 may include information identifying the requested function, as well as a time stamp indicating when the request was received. FIG. 4 shows the historical information with a record 440a corresponding to a request to process function A, a record 440*b* corresponding to a request to process function B, a record 440*c* corresponding to another request to process function A, and a record 440*d* corresponding to a request to process function C. The records 440*a-d* include time stamps. The time stamp in a particular record 440 indicates the time at which the corresponding request was received.

The function processing service 402 includes a condition evaluator 416 that is configured to determine whether the hardware acceleration condition 414 has been satisfied. The condition evaluator 416 may include a querying component 446 that is capable of querying the database 448 to determine how many requests to perform a particular function have been received during a certain period of time. If, for example, a request to perform a particular function is received at time t, the querying component 446 may query the database 448 to determine how many requests to perform that function have been received during a time period corresponding to the defined time interval 430 (e.g., the defined time interval 430 immediately preceding time t). The result of that query may then be compared with the threshold value 428 to determine whether the hardware acceleration condition 414 is satisfied.

Instead of defining a hardware acceleration condition in terms of a threshold value for a particular function, a hardware acceleration condition may instead be defined in terms of a threshold value for a family of related functions. In other words, a hardware acceleration condition may be defined such that whenever a request is received to perform any function within a family of related functions, that counts toward satisfying the threshold value. If the number of such requests that are received within the time interval exceeds the threshold value, then the hardware acceleration condition may be deemed to have been satisfied, and hardware acceleration may be used to perform any function within the family of related functions.

In embodiments where a hardware acceleration condition is defined in terms of a threshold value for a family of related functions, the hardware acceleration condition may be implemented with or without a temporal constraint. In other words, in some embodiments the threshold value may be defined in terms of the total number of requests that have been received in connection with any function in a family of related functions, regardless of when those requests were received. Alternatively, in other embodiments the threshold value may be defined in terms of the total number of requests that have been received in connection with any function in a family of related functions during a defined time interval. In embodiments where a hardware acceleration condition is defined in terms of a threshold value for a family of related functions and a temporal constraint is utilized, the temporal constraint may be implemented in a variety of ways, including the ways discussed above (e.g., counters and historical information).

Figure 5:
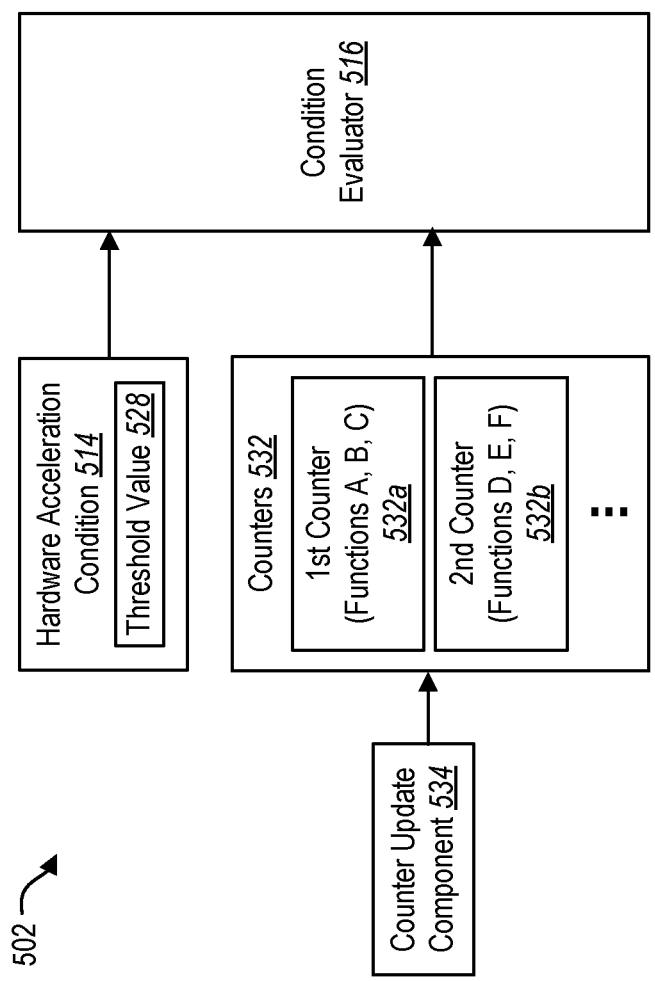
FIG. 5 illustrates aspects of a function processing service that implements a hardware acceleration condition based on the number of requests to perform a function that have been received in connection with any function in a family of related functions.

FIG. 5 illustrates aspects of a function processing service 502 that implements a hardware acceleration condition 514 based on the number of requests to perform a function that have been received in connection with any function in a family of related functions. For the sake of simplicity, no temporal constraint is utilized in the depicted embodiment.

The function processing service 502 may define a threshold value 528 that indicates the minimum number of requests to perform any function in a family of related functions that should be received in order to justify the use of hardware acceleration for the functions in that family. The function processing service 502 may also keep track of the number of requests that have been received in connection with various families of functions. In the depicted embodiment, the function processing service 502 utilizes counters 532 corresponding to different families of functions that may be performed by the function processing service 502. It will be assumed that at least two families of functions have been defined: (i) a first family of functions that includes function A, function B, and function C, and (ii) a second family of functions that includes function D, function E, and function F. FIG. 5 shows the function processing service 502 with a first counter 532*a* and a second counter 532*b*. The first counter 532*a* indicates the number of requests that have been received to perform any of the functions in the first family of functions (function A, function B, or function C). The second counter 532*b* indicates the number of requests that have been received to perform any of the functions in the second family of functions (function D, function E, or function F).

The function processing service 502 may also include a counter update component 534 that is configured to update the counters 532 when requests to perform particular functions are received. When the function processing service 502 receives a request to perform a particular function, the counter update component 534 may increment the corresponding counter 532. Because the counters 532 correspond to particular families of functions, requests to perform different functions may cause the same counter 532 to be updated. For example, if the function processing service 502 receives a request to perform function A, the first counter 532*a* may be updated because the first counter 532*a* corresponds to the same family of functions to which function A belongs. If the function processing service 502 subsequently receives a request to perform function B, the first counter 532*a* may once again be updated because function B belongs to the same family as function A. If, however, the function processing service 502 subsequently receives a request to perform function D, a different counter (specifically, the second counter 532*b*) may be updated because function D belongs to a different family than function A and function B.

The function processing service 502 includes a condition evaluator 516 that is configured to determine whether the hardware acceleration condition 514 has been satisfied. The hardware acceleration condition 514 may be defined such that hardware acceleration is performed for a particular function if the value of the relevant counter 532 (i.e., the counter 532 corresponding to the family of functions to which the specified function belongs) exceeds the defined threshold value 528. Thus, when the function processing service 502 receives a request to perform a particular function (e.g., function A), the condition evaluator 516 may compare the value of the counter 532 corresponding to the family of functions to which the specified function belongs (e.g., the first counter 532*a*) to the threshold value 528. If the value of the corresponding counter 532 exceeds the threshold value 528, the condition evaluator 516 may conclude that the hardware acceleration condition 514 has been satisfied and hardware acceleration may be used to perform the function. If, however, the value of the corresponding counter 532 is less than the threshold value 528, the condition evaluator 516 may conclude that the hardware acceleration condition 514 has not been satisfied. If no other hardware acceleration condition has been satisfied for the function, the function may be carried out using a general-purpose processor.

In some embodiments, a hardware acceleration condition may be based on an estimated cost savings associated with the use of hardware acceleration to perform a function compared to performing the function via a general-purpose processor. Generally speaking, less energy is required to perform a function via hardware acceleration than to perform the function via a general-purpose processor. This energy savings can lead to cost savings as well. If the cost savings is sufficiently high, then this could justify the use of hardware acceleration to perform the function.

In some embodiments, a hardware acceleration condition may be defined in terms of a threshold value that indicates the minimum estimated cost savings that would justify the use of hardware acceleration. When hardware acceleration is being considered for a particular function, the cost savings for using hardware acceleration may be estimated. This estimated cost savings may then be compared with the threshold value. If the estimated cost savings exceeds the threshold value, then it may be concluded that the hardware acceleration condition is satisfied, and hardware acceleration may be used to perform the function.

Some examples of factors that can be considered in connection with determining the cost savings for using hardware acceleration include (i) the cost of the general-purpose processor per second of runtime, (ii) the cost of the energy that is consumed, and (iii) an energy-delay product. Each of these factors can be weighted independently in a cost model.

As an example, assume that the baseline function takes I instructions and T seconds to complete on a general-purpose processor, the cost of the processor is C, and the energy needed to complete the operation is E joules. Using hardware acceleration, the operations might be completed in Ta=T/k1 seconds and use E/k2 joules of energy. Also, the cost of the accelerator time may be C/(k3*Ta). The parameter k1 indicates how much faster the function can be performed using hardware acceleration as compared to using a general-purpose processor. The parameter k2 indicates how much energy can be saved using hardware acceleration as compared to using a general-purpose processor. The parameter k3 indicates how much less expensive it is to use hardware acceleration as compared to using a general-purpose processor. The parameters k1, k2, and k3 can be measured for certain operations, and those measurements can be used to estimate these parameters for other operations.

Figure 6:
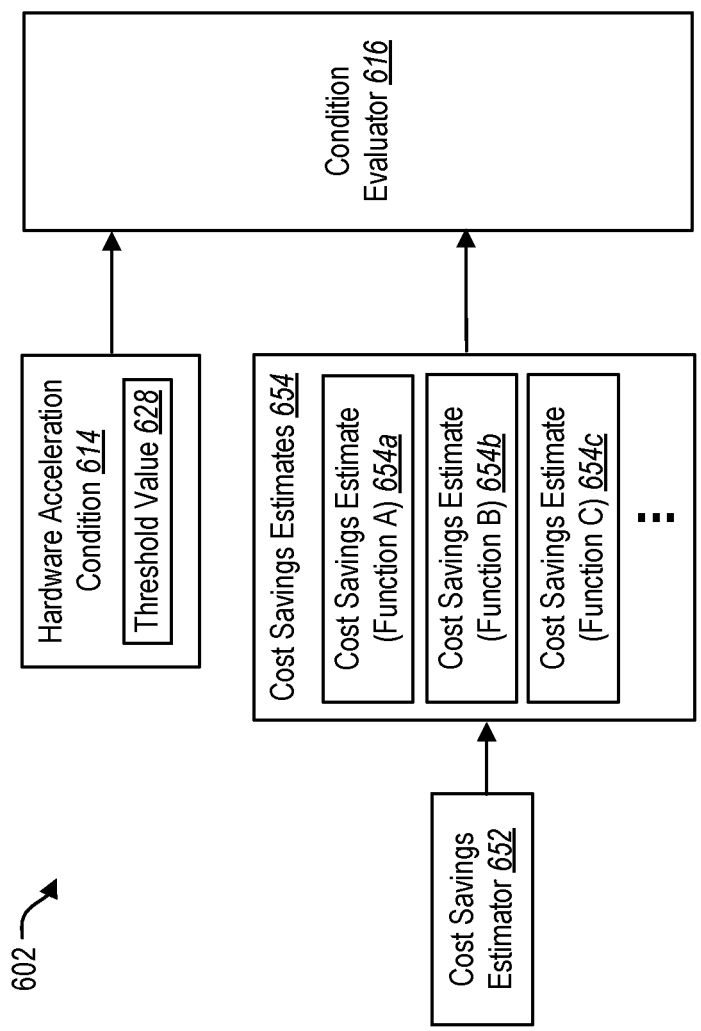
FIG. 6 illustrates aspects of a function processing service that implements a hardware acceleration condition based on an estimated cost savings associated with the use of hardware acceleration to perform a function.

FIG. 6 illustrates aspects of a function processing service 602 that implements a hardware acceleration condition 614 based on an estimated cost savings associated with the use of hardware acceleration to perform a function. As before, the function processing service 602 may define a threshold value 628 that indicates the minimum estimated cost savings that would justify the use of hardware acceleration.

The function processing service 602 may include a component that is configured to obtain estimates 654 of the cost savings for using hardware acceleration in connection with particular functions. This component may be referred to herein as a cost savings estimator 652. FIG. 6 shows several examples of cost savings estimates 654, including a cost savings estimate 654a for function A, a cost savings estimate 654b for function B, and a cost savings estimate 654c for function C.

The function processing service 602 includes a condition evaluator 616 that is configured to determine whether the hardware acceleration condition 614 has been satisfied. The hardware acceleration condition 614 may be defined such that hardware acceleration is performed for a particular function if the value of the corresponding cost savings estimate 654 exceeds the defined threshold value 628. Thus, when the function processing service 602 receives a request to perform a particular function (e.g., function A), the condition evaluator 616 may compare the value of the cost savings estimate 654 corresponding to that function (e.g., the cost savings estimate 654a corresponding to function A) to the threshold value 628. If the value of the corresponding cost savings estimate 654 exceeds the threshold value 628, the condition evaluator 616 may conclude that the hardware acceleration condition 614 has been satisfied and hardware acceleration may be used to perform the function. If, however, the value of the corresponding cost savings estimate 654 is less than the threshold value 628, the condition evaluator 616 may conclude that the hardware acceleration condition 614 has not been satisfied. If no other hardware acceleration condition is satisfied for the function, the function may be carried out using a general-purpose processor.

In some embodiments, a function library may be maintained. Functions can be added to the function library on an ongoing basis. In this context, the term "function library" may refer to a library of functions that are implemented in hardware circuits. In such embodiments, a hardware acceleration condition may be based on whether a particular function is already included in the function library. For example, when hardware acceleration is being considered for a particular function, a determination may be made about whether that function is already included in the function library. If it is, then it may be concluded that the hardware acceleration condition is satisfied, and hardware acceleration may be used to perform the function.

Figure 7:
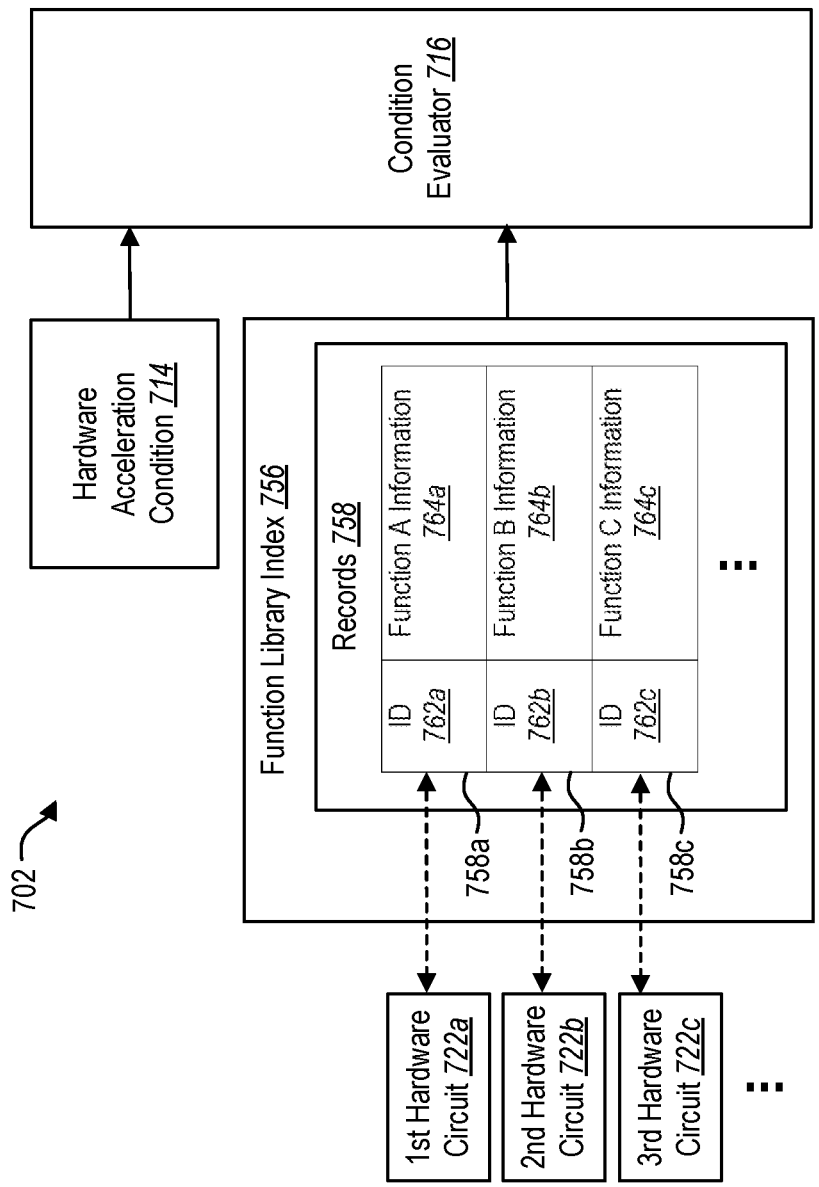
FIG. 7 illustrates aspects of a function processing service that maintains a function library, and that implements a hardware acceleration condition based on whether a particular function is already included in the function library.

FIG. 7 illustrates aspects of a function processing service 702 that maintains a function library, and that implements a hardware acceleration condition 714 based on whether a particular function is already included in the function library.

In the depicted embodiment, the function processing service 702 maintains a function library index 756, which includes information about the functions that are presently included in the function library. The function library index 756 may include a plurality of records 758, and each record 758 may identify a particular function in the function library as well as a hardware circuit that has been configured to perform that function. FIG. 7 shows the function library index 756 with a first record 758a, a second record 758b, and a third record 758c. The first record 758a includes identifying information 764a about function A as well as an identifier 762a corresponding to a first hardware circuit 722a that has been configured to perform function A. Similarly, the second record 758b includes identifying information 764b about function B as well as an identifier 762b corresponding to a second hardware circuit 722b that has been configured to perform function B. The third record 758c includes identifying information 764c about function C as well as an identifier 762c corresponding to a third hardware circuit 722c that has been configured to perform function C.

The function processing service 702 includes a condition evaluator 716 that is configured to determine whether the hardware acceleration condition 714 has been satisfied. The hardware acceleration condition 714 may be defined such that hardware acceleration is performed for a particular function if that function is already included in the function library. To determine whether a particular function is already included in the function library, the condition evaluator 716 may be configured to determine whether identifying information about that function is included in the function library index 756. Thus, when the function processing service 702 receives a request to perform a particular function (e.g., function A), the condition evaluator 716 may search for identifying information about the function (e.g., identifying information 764a about function A) in the function library index 756. If the condition evaluator 716 finds identifying information about the requested function in the function library index 756, the condition evaluator 716 may conclude that the hardware acceleration condition 714 has been satisfied and hardware acceleration may be used to perform the function. If, however, the condition evaluator 716 does not find identifying information about the function in the function library index 756, the condition evaluator 716 may conclude that the hardware acceleration condition 714 has not been satisfied. If no other hardware acceleration condition has been satisfied for the function, the function may be carried out using a general-purpose processor.

As indicated above, functions can be added to the function library on an ongoing basis. In some embodiments, whenever hardware acceleration is used to perform a function, the function may be added to the function library as long as there is space to implement the function on the available hardware circuits. When available space becomes limited, then higher-priority functions (e.g., based on amount of usage) may be retained in the function library.

As indicated above, a function processing service may be utilized to execute source code that includes instructions to perform one or more functions. When a function processing service receives a request to execute source code that includes instructions to perform a particular function, a determination may be made about whether a hardware acceleration condition is satisfied. In some embodiments, a plurality of hardware acceleration conditions may be defined. In embodiments where a plurality of hardware acceleration conditions are defined, hardware acceleration may be utilized in connection with a particular function if any of the hardware acceleration conditions are satisfied. If, however, none of the hardware acceleration conditions are satisfied, the function may be performed using a general-purpose processor.

Figure 8:
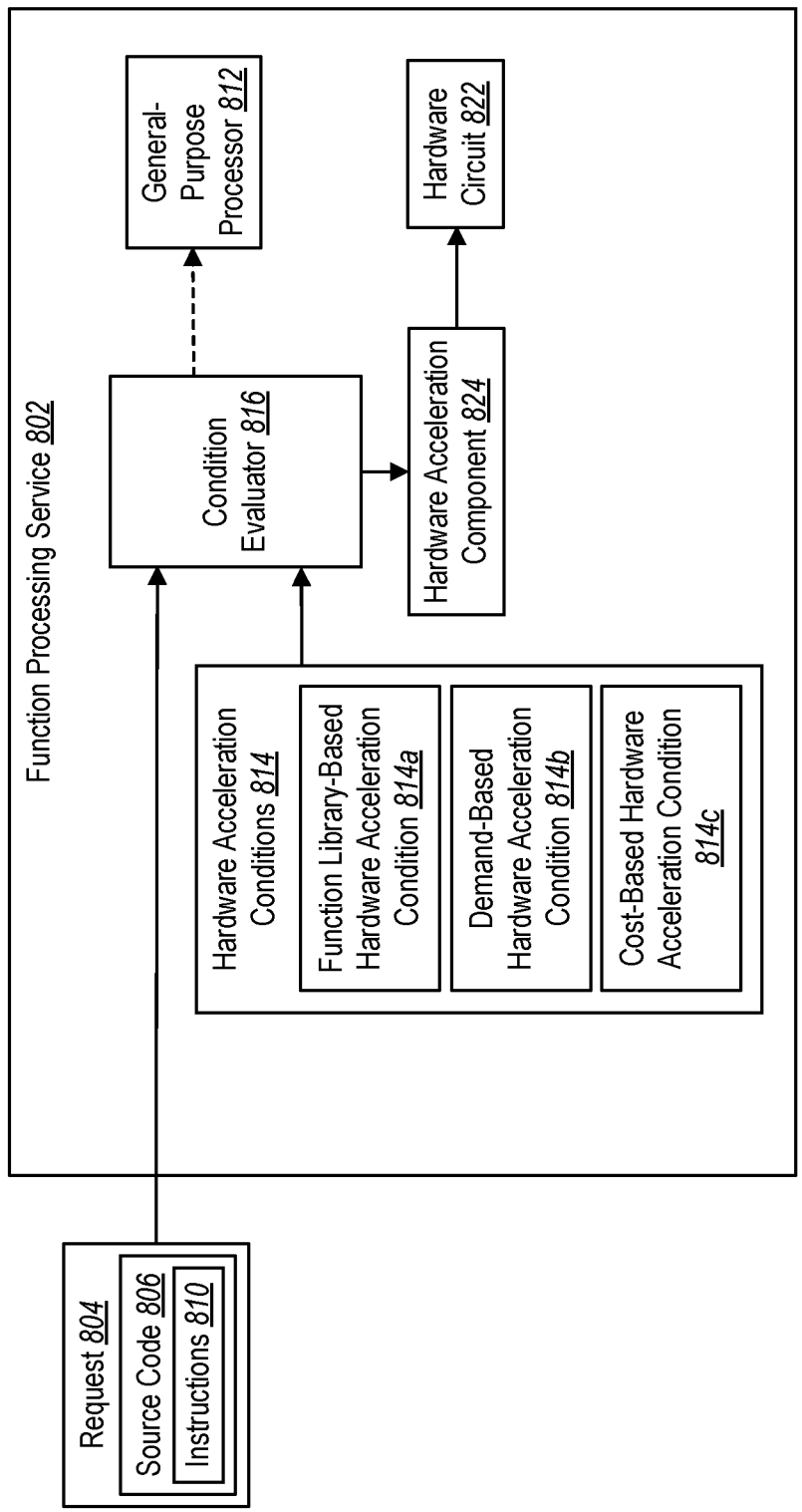
FIG. 8 illustrates an example of a function processing service for which a plurality of hardware acceleration conditions have been defined.

FIG. 8 illustrates an example of a function processing service 802 for which a plurality of hardware acceleration conditions 814 have been defined. For example, a hardware acceleration condition 814a has been defined based on whether a particular function is already included in a function library. In the discussion that follows, this type of hardware acceleration condition 814a may be referred to as a function library-based hardware acceleration condition 814a. An example of a function library-based hardware acceleration condition 814a was discussed above in connection with FIG. 7.

In addition, a hardware acceleration condition 814b has been defined based on the number of requests to perform a function that have been received. In the discussion that follows, this type of hardware acceleration condition 814b may be referred to as a demand-based hardware acceleration condition 814b. Several examples of demand-based hardware acceleration conditions 814b were discussed above in connection with FIGS. 2-5. Although just a single demand-based hardware acceleration condition 814b is shown in FIG. 8, in some embodiments more than one demand-based hardware acceleration condition 814b may be defined.

In addition, a hardware acceleration condition 814c has been defined based on an estimated cost savings associated with the use of hardware acceleration to perform a function. In the discussion that follows, this type of hardware acceleration condition 814c may be referred to as a cost-based hardware acceleration condition 814c. An example of a cost-based hardware acceleration condition 814c was discussed above in connection with FIG. 6.

Figure 9:
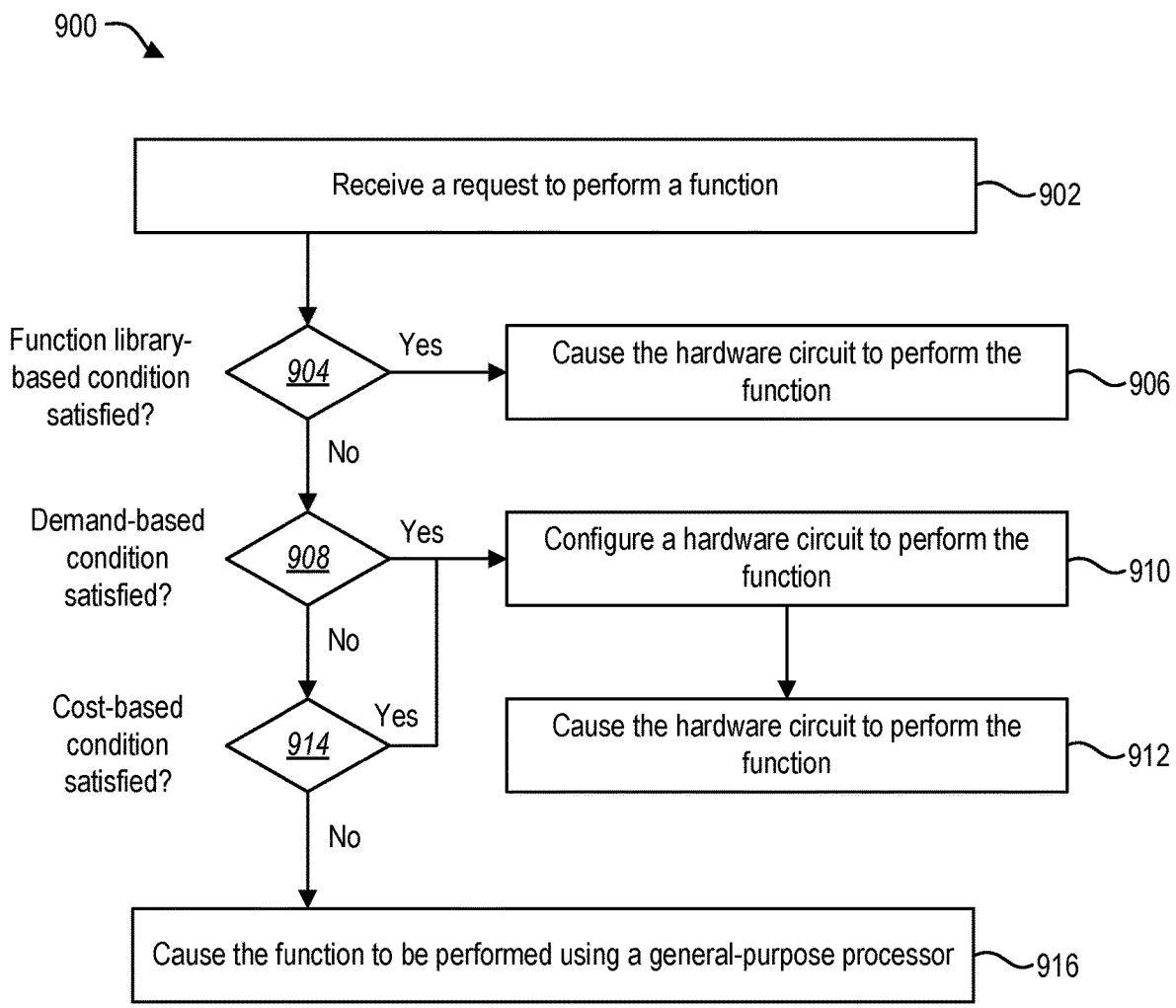
FIG. 9 illustrates an example of a method that may be performed by a condition evaluator in a function processing system.

The function processing service 802 includes a condition evaluator 816 that is configured to determine whether any of the hardware acceleration conditions 814a-c have been satisfied. The function processing service 802 also includes a hardware acceleration component 824 that is configured to facilitate the use of hardware acceleration. FIG. 9 illustrates an example of a method 900 that may be performed by the condition evaluator 816 and the hardware acceleration component 824.

The method 900 includes receiving 902 a request 804 to perform a function. More specifically, the condition evaluator 816 may receive a request 804 to execute source code 806, and the source code 806 may include instructions 810 that, if executed by a general-purpose processor 812, cause a particular function to be performed.

In response to receiving 902 the request, the condition evaluator 816 may determine whether any of the defined hardware acceleration conditions 814 have been satisfied. In the depicted example, the condition evaluator 816 initially determines 904 whether the function library-based hardware acceleration condition 814a has been satisfied. If the condition evaluator 816 determines 904 that the function library-based hardware acceleration condition 814a has been satisfied, this means that a hardware circuit 822 has already been configured to perform the function. Therefore, the method 900 may then include causing 906 the hardware circuit 822 to perform the function.

If, however, the condition evaluator 816 determines 904 that the function library-based hardware acceleration condition 814a has not been satisfied, the condition evaluator 816 may then determine whether another one of the defined hardware acceleration conditions 814 has been satisfied. In the depicted example, the condition evaluator 816 next determines 908 whether the demand-based hardware acceleration condition 814b has been satisfied. If the demand-based hardware acceleration condition 814b has been satisfied, then the method 900 may include configuring 910 a hardware circuit 822 to perform the function (because it was previously determined, as part of evaluating the function library-based hardware acceleration condition 814a, that a hardware circuit 822 has not already been configured to perform the function). The method 900 may then include causing 912 the hardware circuit 822 to perform the function.

If, however, the condition evaluator 816 determines 908 that the demand-based hardware acceleration condition 814b has not been satisfied, the condition evaluator 816 may then determine whether another one of the defined hardware acceleration conditions 814 has been satisfied. In the depicted example, the condition evaluator 816 next determines 914 whether the cost-based hardware acceleration condition 814c has been satisfied. If the demand-based hardware acceleration condition 814b has been satisfied, then the method 900 may include configuring 910 a hardware circuit 822 to perform the function and causing 912 the hardware circuit 822 to perform the function.

If, however, the condition evaluator 816 determines 914 that the cost-based hardware acceleration condition 814c has not been satisfied, this means that none of the defined hardware acceleration conditions 814a-c has been satisfied. In this case, the method 900 may then involve causing 916 the function to be performed using a general-purpose processor 812.

In some embodiments, a function processing service may be configured so that a user (i.e., a person or entity who submits request(s) to execute source code) is able to choose whether the option of hardware acceleration is implemented. When a user submits a request to perform a function to a function processing service, the user typically assumes that the function will be carried out using a general-purpose processor. In some embodiments, before a function processing service uses hardware acceleration to perform a function, a user may be notified about the possibility of using hardware acceleration and given the opportunity to choose whether or not hardware acceleration can be performed.

Figure 9A:
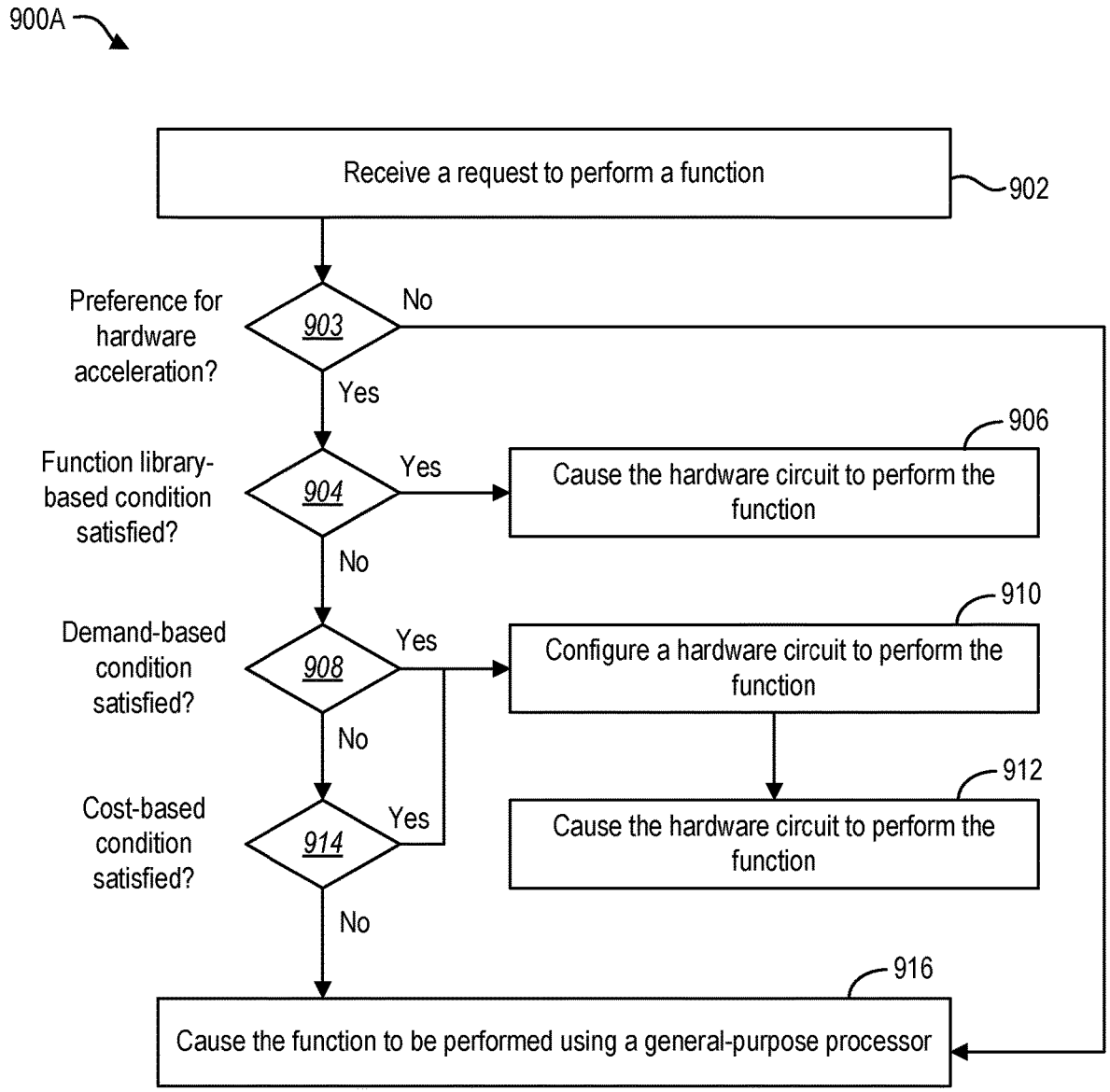
FIG. 9A illustrates an example of an alternative method that may be implemented by a condition evaluator in an embodiment where a user is given the opportunity to choose whether or not hardware acceleration can be performed.

FIG. 9A illustrates an example of an alternative method 900A that may be implemented by a condition evaluator 816 in an embodiment where a user is given the opportunity to choose whether or not hardware acceleration can be performed. The method 900A is similar to the method 900 shown in FIG. 9, except as indicated below.

As before, the method 900A includes receiving 902 a request 804 to perform a function. However, the method 900A also includes determining 903 whether the user has indicated a preference for using hardware acceleration when it would be beneficial to do so (e.g., when one or more hardware acceleration conditions 814a-c are satisfied). In some embodiments, determining 903 whether the user has indicated a preference for using hardware acceleration may involve accessing stored information about user preferences. As another example, determining 903 whether the user has indicated a preference for using hardware acceleration may involve prompting the user for authorization to perform hardware acceleration.

If it is determined 903 that the user has not indicated a preference for using hardware acceleration, then the method 900A may proceed to the action of causing 916 the function to be performed using a general-purpose processor 812. If, however, it is determined 903 that the user has indicated a preference for using hardware acceleration, then the method 900A involves determining whether the hardware acceleration conditions 814a-c have been satisfied, in the manner described above.

The specific order in which the hardware acceleration conditions 814a-c are evaluated in the methods 900, 900A shown in FIGS. 9 and 9A is provided for purposes of example only and should not be interpreted as limiting the scope of the present disclosure. In alternative embodiments, the hardware acceleration conditions 814a-c may be evaluated in a different order. In some embodiments, once a determination has been made that a hardware acceleration condition is satisfied and hardware acceleration is going to be utilized in connection with the function, a determination may then be made about whether a hardware circuit has already been configured for the function.

To configure a hardware circuit to perform a particular function, the source code that includes the instructions for performing the function may be translated into hardware-specific code corresponding to the type of hardware circuit that is going to be used. For example, if an FPGA is going to be used to perform hardware acceleration, then the source code may be translated into hardware description language (HDL) code corresponding to the FPGA. If a GPU is going to be used to perform hardware acceleration, then the source code may be translated into GPU code. If a programmable ASIC is going to be used to perform hardware acceleration, then a custom compiler may take the source code and generate machine code that is specific to the programmable ASIC. If a DSP is going to be used to perform hardware acceleration, then the source code may be translated into DSP code.

Once the source code has been translated into hardware-specific code corresponding to the type of hardware circuit that is going to be used, the hardware-specific code may then be provided to the hardware circuit. The function may then be performed via the hardware circuit. The result that is obtained from performing the function may then be provided to the entity that requested the function to be performed.

As indicated above, a function processing service may maintain a function library. In some embodiments, a function processing service may add a function to the library whenever a determination is made that a hardware acceleration condition corresponding to the function has been satisfied. In other words, once a determination has been made that a hardware acceleration condition has been satisfied for a particular function, a hardware circuit may be configured to perform that function and the function may be added to the library. Then, upon subsequently receiving a request to execute source code that includes instructions to perform the function, the function may be performed via the hardware circuit.

Figure 10:
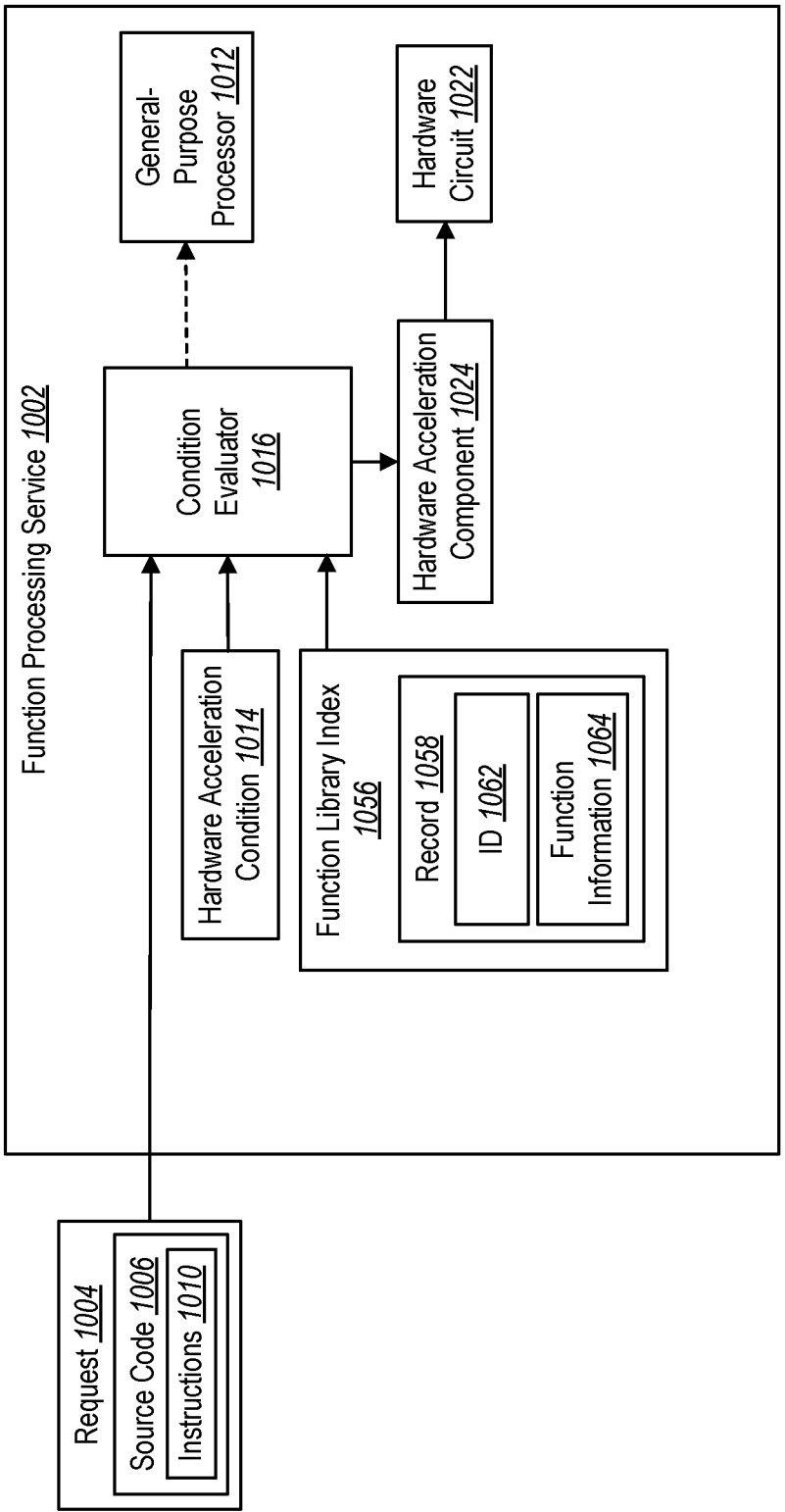
FIG. 10 illustrates an example of a function processing service that maintains a function library.
Figure 11:
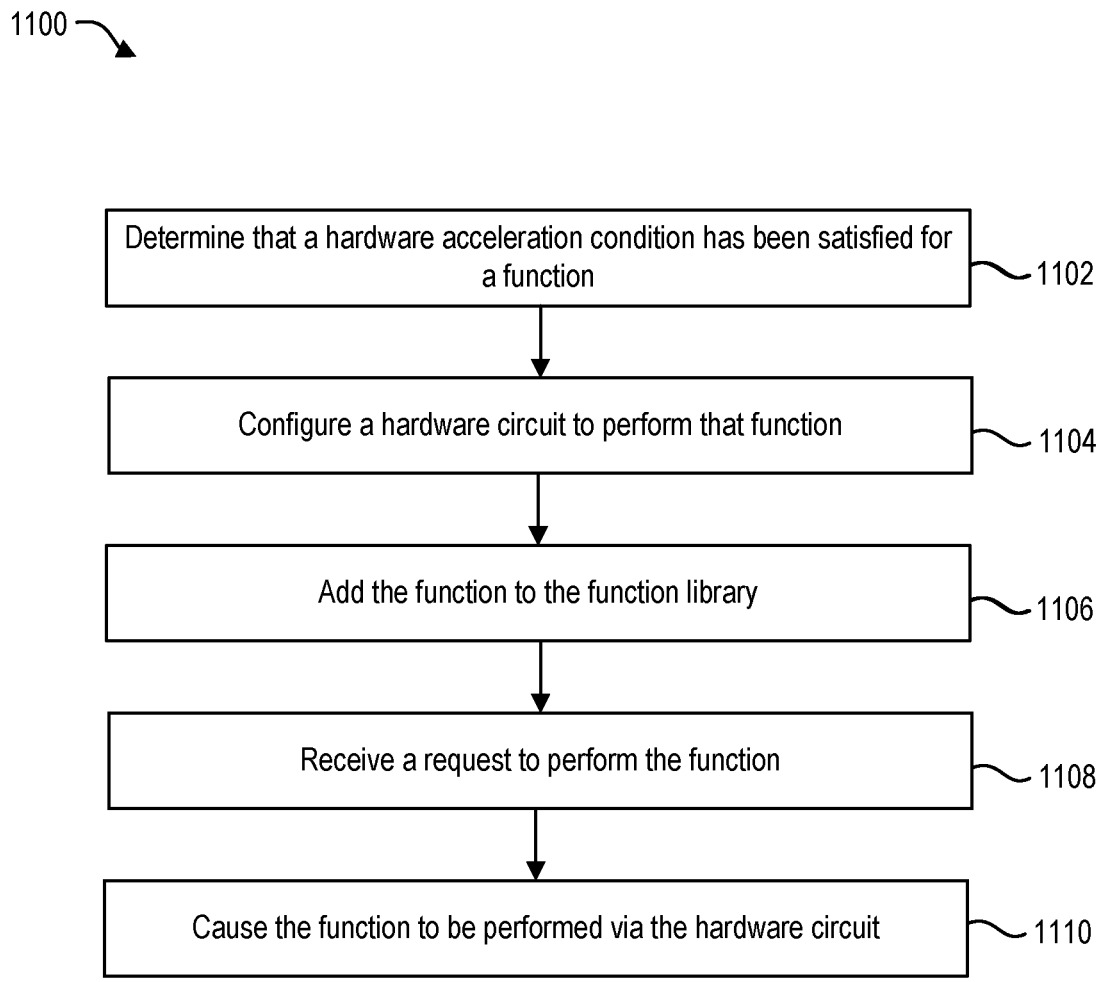
FIG. 11 illustrates an example of a method that may be performed by the function processing service shown in FIG. 10.

FIG. 10 illustrates an example of a function processing service 1002 that maintains a function library. FIG. 11 illustrates an example of a method 1100 that may be performed by the function processing service 1002 in accordance with the present disclosure. The various components of the function processing service 1002 will be described in connection with the method 1100.

The method 1100 includes determining 1102 that a hardware acceleration condition 1014 has been satisfied for a particular function. This determination may be made by a condition evaluator 1016 in the function processing service 1002. In some embodiments, this determination may be made in response to receiving a request to execute source code. Alternatively, in other embodiments, this determination may be made independently of receiving a specific request to execute source code. For example, the function processing service 1002 may determine that a cost-based hardware acceleration condition is satisfied for a particular function in advance of receiving a request to perform that function.

In response to determining 1102 that a hardware acceleration condition 1014 has been satisfied for a particular function, a hardware circuit 1022 may be configured 1104 to perform that function. This operation may be performed by a hardware acceleration component 1024 in the function processing service 1002. In addition, the function may be added to the function library that is maintained by the function processing service 1002. This may involve adding a record 1058 to the function library index 1056. The record 1058 may include identifying information 1064 about the function as well as an identifier 1062 corresponding to the hardware circuit 1022 that has been configured to perform the function.

At some point after the function has been added to the function library, a request 1004 may be received 1108 to perform the function. More specifically, a request 1004 to execute source code 1006 may be received. The source code 1006 may include instructions 1010 that, if executed by a general-purpose processor 1012, cause the function to be performed.

In response to receiving the request 1004, the function processing service 1002 may cause 1110 the function to be performed via the hardware circuit 1022. This may involve providing input data to the hardware circuit 1022, as well as instructions to commence processing the input data. In some embodiments, the function processing service 1002 may cause 1110 the function to be performed via the hardware circuit 1022 in response to receiving the request 1004 and determining that the function is included in the function library that is maintained by the function processing service 1002. Alternatively, in other embodiments, the function processing service 1002 may cause 1110 the function to be performed via the hardware circuit 1022 in response to receiving the request 1004, determining that the function is included in the function library that is maintained by the function processing service 1002, and determining that at least one addition hardware acceleration condition has been satisfied (e.g., that the user has expressed a preference for hardware acceleration).

Figure 12:
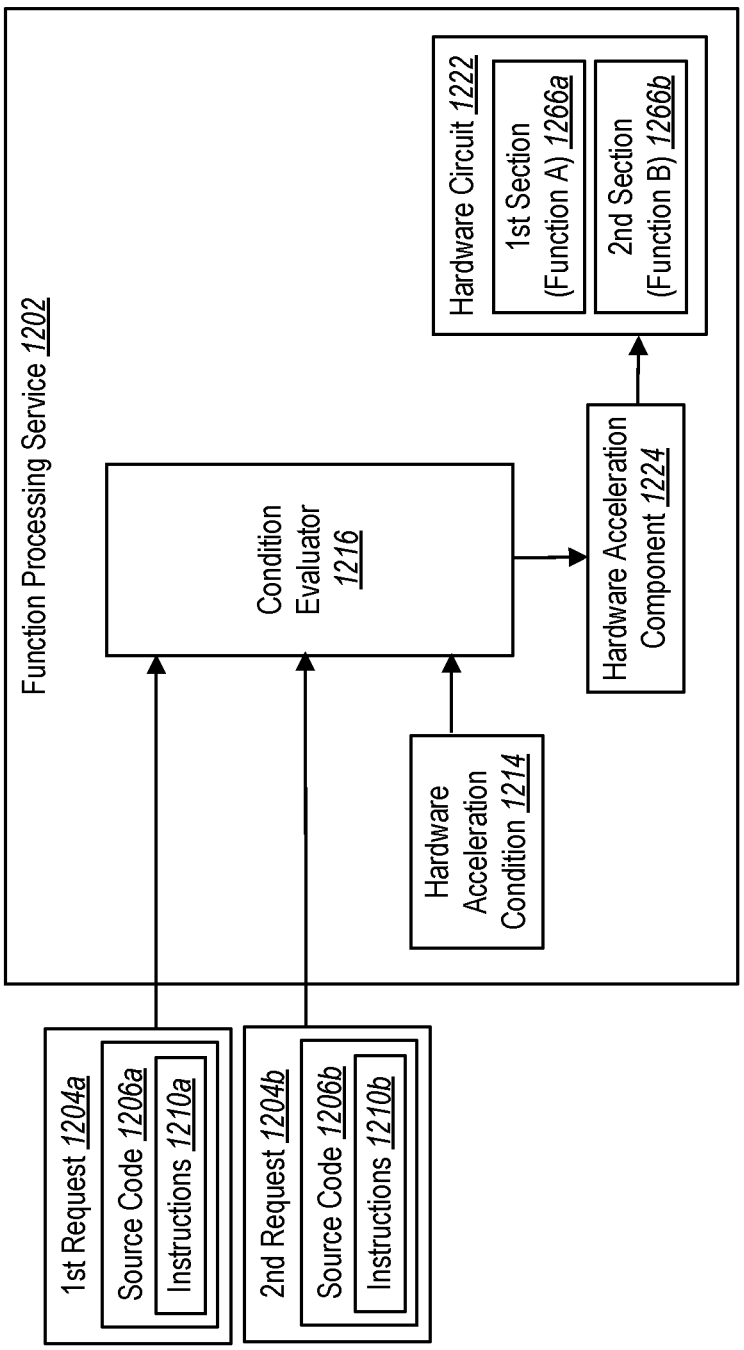
FIG. 12 illustrates an example of a hardware circuit that has been configured to perform two different functions.

In some embodiments, a hardware circuit may be configured to perform a plurality of functions in parallel. For example, a hardware circuit may be configured to perform a plurality of different functions in parallel with one another. FIG. 12 illustrates an example of a hardware circuit 1222 that has been configured to perform two different functions, function A and function B, in parallel with one another. In particular, a first section 1266a of the hardware circuit 1222 has been configured to perform function A, and a second section 1266b of the hardware circuit 1222 has been configured to perform function B.

There are various scenarios in which such a hardware circuit 1222 may be utilized. As an example, suppose that a function processing service 1202 receives multiple requests 1204a-b to execute source code 1206a-b. The source code 1206a in the first request 1204a may include instructions 1210a that, if executed by a general-purpose processor, cause function A to be performed. The source code 1206b in the second request 1204b may include instructions 1210b that, if executed by the general-purpose processor, cause function B to be performed. The requests 1204a-b may be received at substantially the same time, and/or the function processing service 1202 may attempt to fulfill the requests 1204a-b at substantially the same time. In response to a condition evaluator 1216 determining that at least one hardware acceleration condition 1214 is satisfied for both function A and function B, a hardware acceleration component 1224 in the function processing service 1202 may cause the hardware circuit 1222 to perform both function A and function B in parallel. In particular, the function processing service 1202 may cause the first section 1266a of the hardware circuit 1222 to perform function A, and the second section 1266b of the hardware circuit 1222 to perform function B.

Although the example shown in FIG. 12 only shows two different functions being performed in parallel, this should not be interpreted as limiting the scope of the present disclosure. More than two functions may be performed in parallel in accordance with the present disclosure. In general, there may be N pipelines running in parallel (where the term "pipeline" refers to a section of a hardware circuit that is configured to execute a particular function, and where N may be any positive integer). These N pipelines may be configured to execute up to N different functions in parallel.

Figure 13:
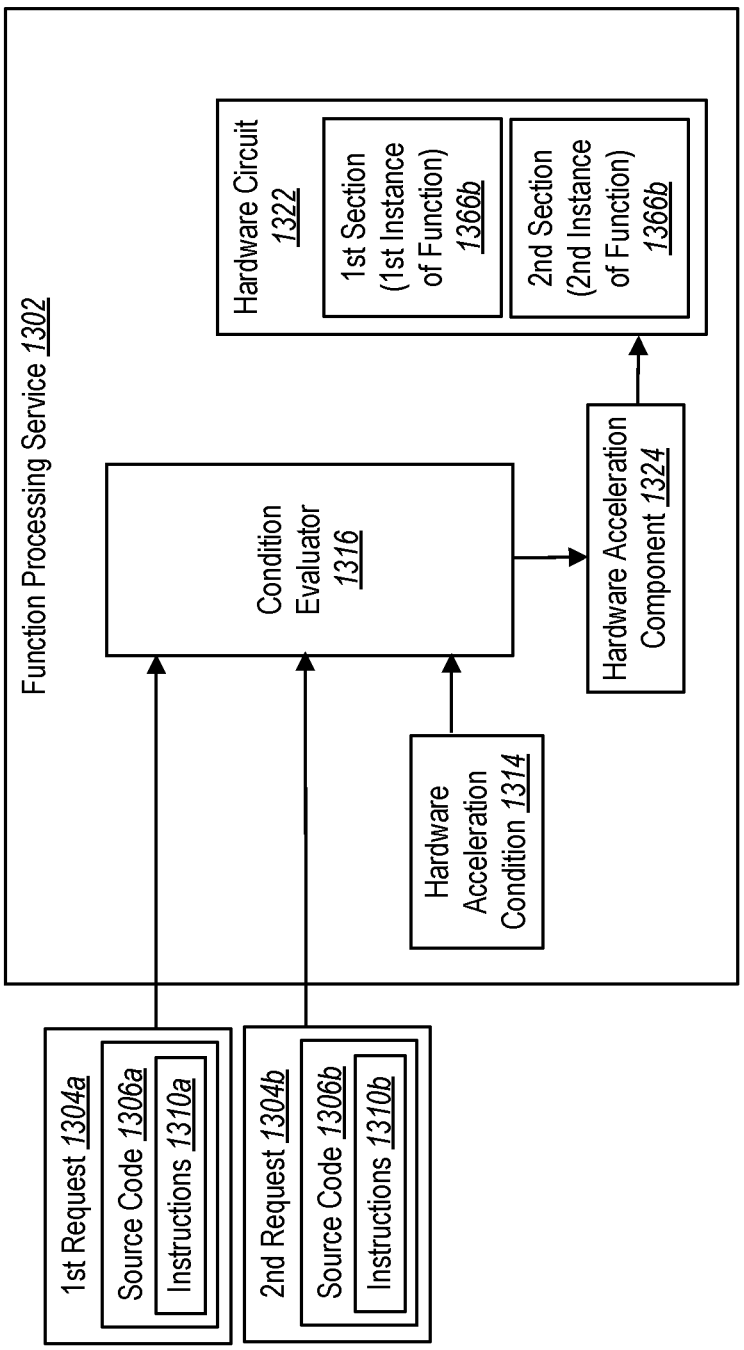
FIG. 13 illustrates an example of a hardware circuit that has been configured to perform two different instances of the same function.

As another example, a hardware circuit may be configured to perform a plurality of different instances of the same function in parallel with one another. FIG. 13 illustrates an example of a hardware circuit 1322 that has been configured to perform two instances of the same function in parallel with one another. In particular, a first section 1366a of the hardware circuit 1322 has been configured to perform a first instance of the function, and a second section 1366b of the hardware circuit 1322 has been configured to perform a second instance of the function.

An example will be described that is similar to the example discussed above in connection with the hardware circuit 1222 shown in FIG. 12. Suppose that a function processing service 1302 receives multiple requests 1304a-b to execute source code 1306a-b. Further suppose that the source code 1306a-b in both requests 1304a-b includes instructions 1310a-b that, if executed by a general-purpose processor 1312, cause a particular function to be performed. The requests 1304a-b may be received at substantially the same time, and/or the function processing service 1302 may attempt to fulfill the requests 1304a-b at substantially the same time. In response to a condition evaluator 1316 determining that at least one hardware acceleration condition 1314 is satisfied for the function, a hardware acceleration component 1324 within the function processing service 1302 may cause the hardware circuit 1322 to perform two different instances of the function in parallel. In particular, the function processing service 1302 may cause the first section 1366a of the hardware circuit 1322 to perform a first instance of the function, and the second section 1366b of the hardware circuit 1322 to perform a second instance of the function.

Although the example shown in FIG. 13 only shows two instances of a function being performed in parallel, this should not be interpreted as limiting the scope of the present disclosure. More than two instances of a particular function may be performed in parallel in accordance with the present disclosure. In general, there may be N pipelines running in parallel (where the term "pipeline" refers to a section of a hardware circuit that is configured to execute the function, and where N may be any positive integer). These N pipelines may be configured to execute up to N instances of the function in parallel.

In accordance with another aspect of the present disclosure, hardware acceleration may be utilized in connection with different functions during different time intervals. In other words, a particular set of hardware circuits may be periodically reconfigured to perform different functions. This may be advantageous in a scenario where a function processing service has a particular set of hardware circuits available for use, and the function processing service receives different types of requests at different points in time (e.g., different times of the day). In this case, the set of hardware circuits may be configured to perform one set of functions during one particular time interval (e.g., one part of the day) and to perform another set of functions during another time interval (e.g., another part of the day).

To identify the functions that should utilize hardware acceleration during a particular time interval, historical information may be analyzed about requests that have previously been received by the function processing service during that time interval. If this analysis indicates that requests to perform a particular set of functions have been frequently received during that time interval, then the available set of hardware circuits may be configured to perform that set of functions.

Figure 14A:
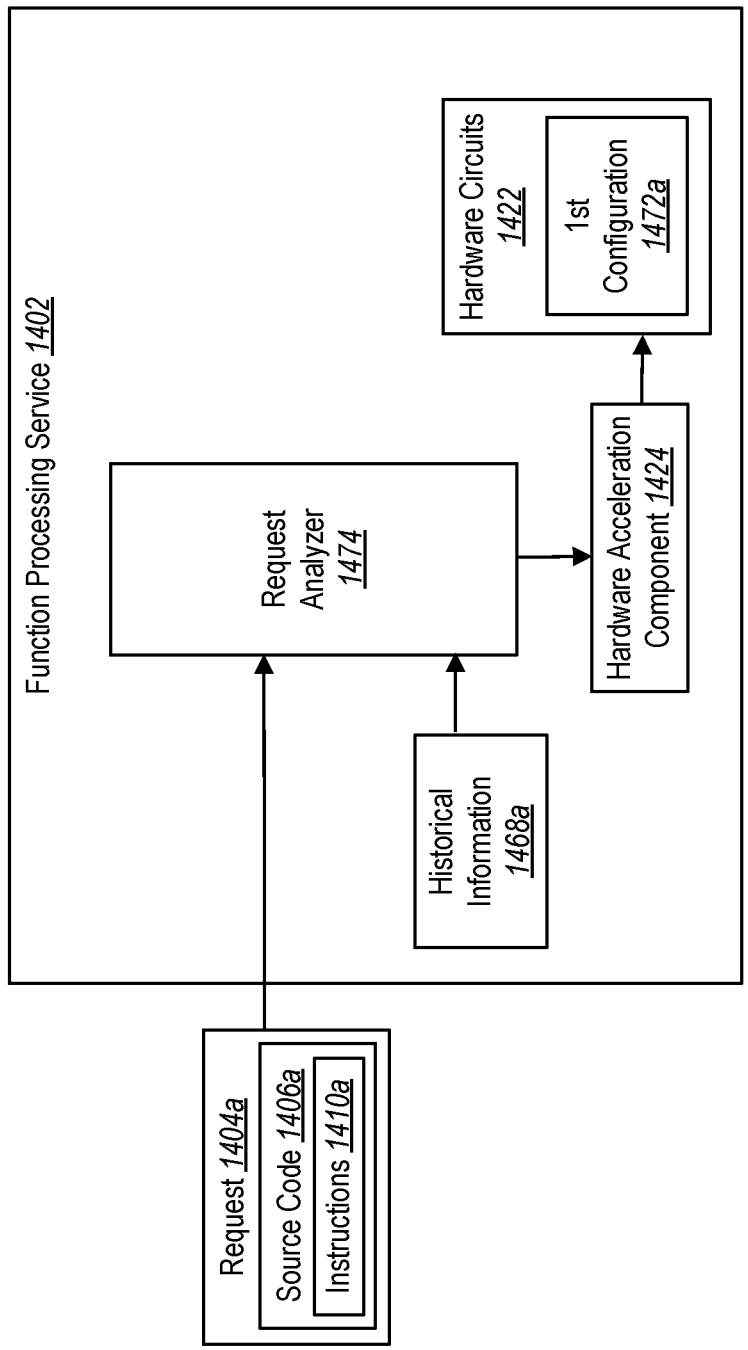
FIGS. 14A-B illustrate an example of a function processing service that periodically reconfigures a set of hardware circuits based on expected demand.
Figure 14B:
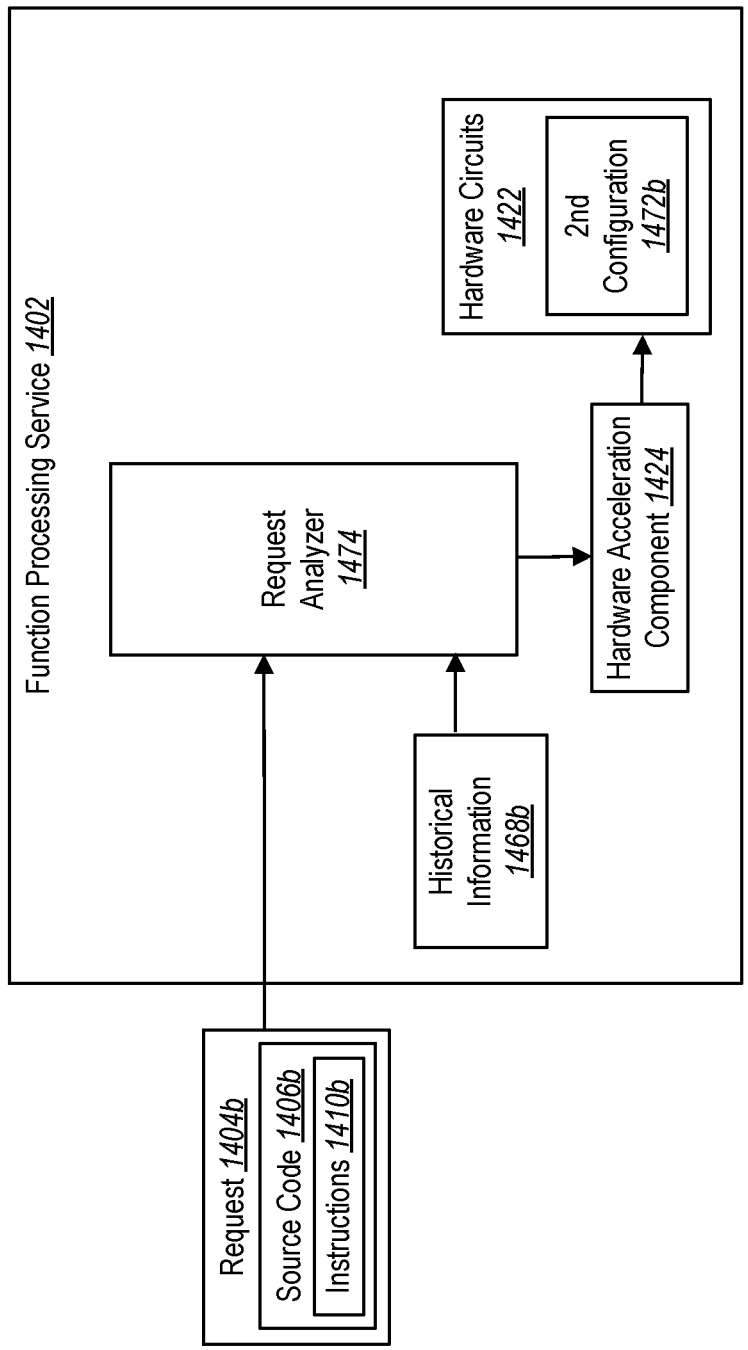
Figure 15:
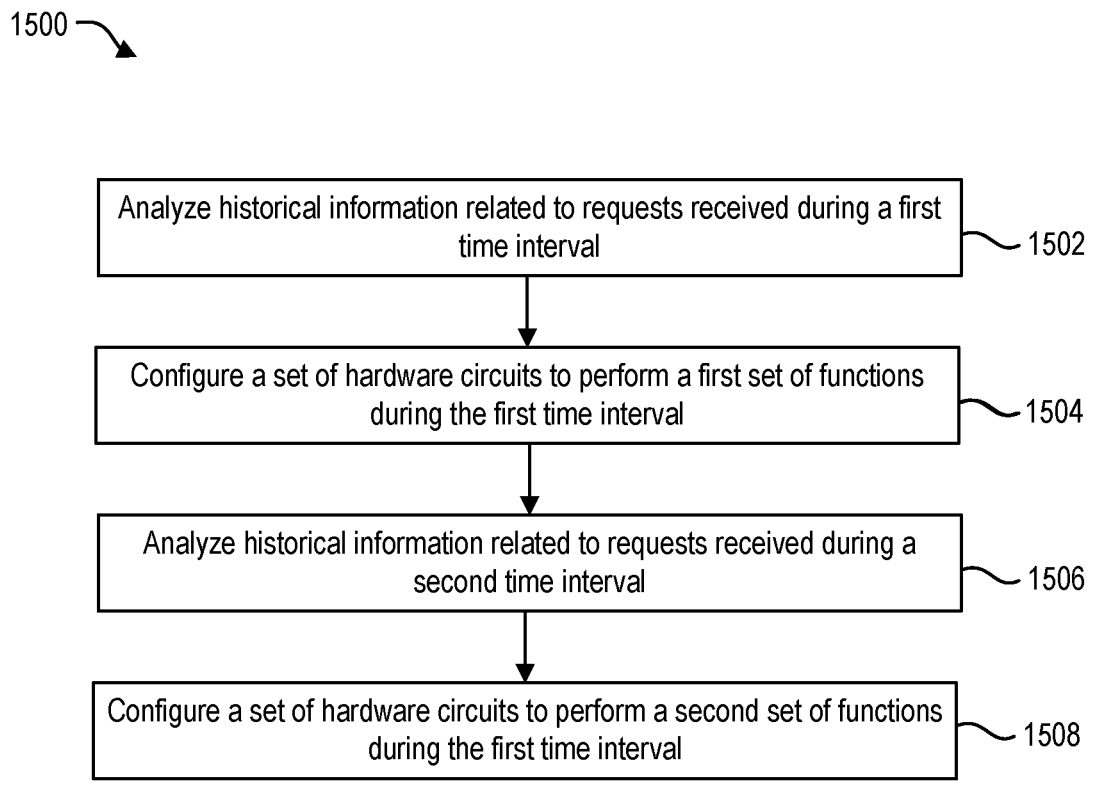
FIG. 15 illustrates an example of a method that may be performed by the function processing service in FIGS. 14A-B.

FIGS. 14A-B illustrate an example of a function processing service 1402 that periodically reconfigures a set of hardware circuits 1422 based on expected demand. FIG. 15 illustrates an example of a method 1500 that may be performed by the function processing service 1402 in accordance with the present disclosure. The various components of the function processing service 1402 will be described in connection with the method 1500.

For the sake of simplicity, only two different time intervals are defined in the function processing service 1402 shown in FIGS. 14A-B. In some embodiments, the time intervals may be non-overlapping time intervals, such that the first time interval does not overlap with the second time interval. In other embodiments, the time intervals may at least partially overlap with one another. The different time intervals may correspond to different parts of the same day, week, month, etc.

The method 1500 includes analyzing 1502 historical information 1468a related to requests received during the first time interval. The function processing service 1402 is shown with a request analyzer 1474 that is configured to analyze the historical information 1468a. Analyzing 1502 the historical information 1468a may involve identifying the types of requests that have been received most frequently during the first time interval. Based on the analysis of this historical information 1468a, a first set of functions may be identified as the functions that are performed most frequently during the first time interval and that could benefit from hardware acceleration. The method 1500 then includes a hardware acceleration component 1424 in the function processing service 1402 configuring 1504 the available hardware circuits 1422 to perform the first set of functions during the first time interval. FIG. 14A shows the hardware circuits 1422 in a first configuration 1472a, in which the hardware circuits 1422 have been configured to perform the first set of functions.

Suppose that the function processing service 1402 receives a request 1404a during the first time interval to execute source code 1406a that includes instructions 1410a to perform a function within the first set of functions. As indicated above, the hardware circuits 1422 have been configured to perform the first set of functions during the first time interval. Therefore, the function processing service 1402 may cause the function to be performed by one of the available hardware circuits 1422 that has been configured to perform the relevant function.

The method 1500 also includes analyzing 1506 historical information 1468b related to requests received during the second time interval. This may involve identifying the types of requests that have been received most frequently during the second time interval. Based on the analysis of this historical information 1468b, a second set of functions may be identified as the functions that are performed most frequently during the second time interval and that could benefit from hardware acceleration. The method 1500 then includes the hardware acceleration component 1424 configuring 1508 the available hardware circuits 1422 to perform the second set of functions during the second time interval.

Suppose that the function processing service 1402 receives a request 1404b during the second time interval to execute source code 1406b that includes instructions 1410b to perform a function within the second set of functions. As indicated above, the hardware circuits 1422 have been configured to perform the second set of functions during the second time interval. Therefore, the function processing service 1402 may cause the function to be performed by one of the available hardware circuits 1422 that has been configured to perform the relevant function.

Figure 16:
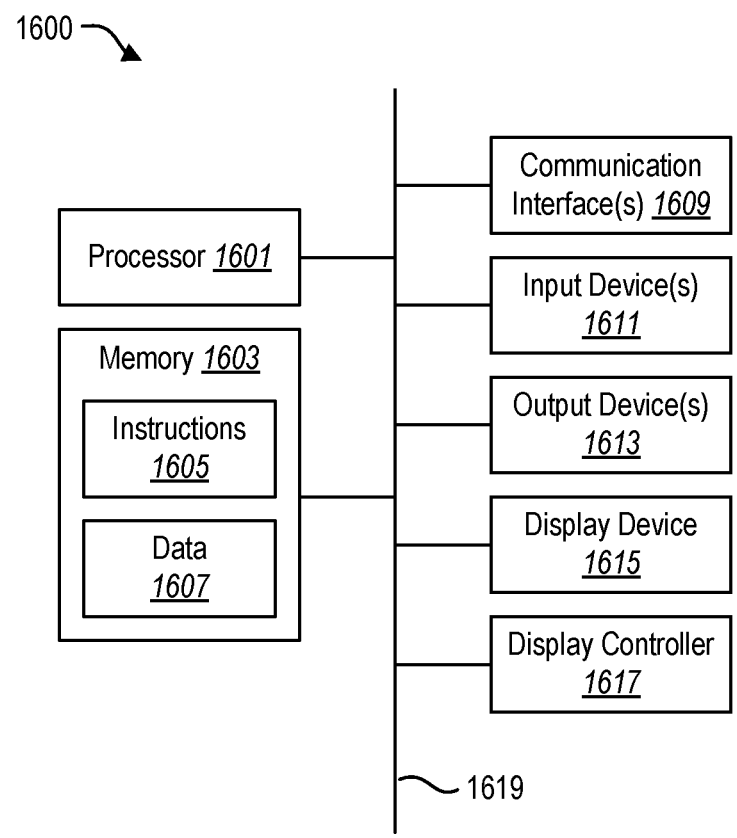
FIG. 16 illustrates certain components that may be included within a computing system.

One or more computing systems may be used to implement a function processing service as disclosed herein. FIG. 16 illustrates certain components that may be included within a computing system 1600.

The computing system 1600 includes a processor 1601. The processor 1601 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1601 may be referred to as a central processing unit (CPU). Although just a single processor 1601 is shown in the computing system 1600 of FIG. 16, in an alternative configuration, a combination of processors (e.g., an ARM and DSP) could be used.

The computing system 1600 also includes memory 1603 in electronic communication with the processor 1601. The memory 1603 may be any electronic component capable of storing electronic information. For example, the memory 1603 may be embodied as random access memory (RAM), read-only memory (ROM), magnetic disk storage media, optical storage media, flash memory devices in RAM, on-board memory included with the processor 1601, erasable programmable read-only memory (EPROM), electrically erasable programmable read-only memory (EEPROM) memory, registers, and so forth, including combinations thereof.

Instructions 1605 and data 1607 may be stored in the memory 1603. The instructions 1605 may be executable by the processor 1601 to implement some or all of the methods, steps, operations, actions, or other functionality that is disclosed herein. Executing the instructions 1605 may involve the use of the data 1607 that is stored in the memory 1603. Unless otherwise specified, any of the various examples of modules and components described herein may be implemented, partially or wholly, as instructions 1605 stored in memory 1603 and executed by the processor 1601. Any of the various examples of data described herein may be among the data 1607 that is stored in memory 1603 and used during execution of the instructions 1605 by the processor 1601.

The computing system 1600 may also include one or more communication interfaces 1609 for communicating with other electronic devices. The communication interface (s) 1609 may be based on wired communication technology, wireless communication technology, or both. Some examples of communication interfaces 1609 include a Universal Serial Bus (USB), an Ethernet adapter, a wireless adapter that operates in accordance with an Institute of Electrical and Electronics Engineers (IEEE) 1602.11 wireless communication protocol, a Bluetooth® wireless communication adapter, and an infrared (IR) communication port.

A computing system 1600 may also include one or more input devices 1611 and one or more output devices 1613. Some examples of input devices 1611 include a keyboard, mouse, microphone, remote control device, button, joystick, trackball, touchpad, and lightpen. One specific type of output device 1613 that is typically included in a computing system 1600 is a display device 1615. Display devices 1615 used with embodiments disclosed herein may utilize any suitable image projection technology, such as liquid crystal display (LCD), light-emitting diode (LED), gas plasma, electroluminescence, or the like. A display controller 1617 may also be provided, for converting data 1607 stored in the memory 1603 into text, graphics, and/or moving images (as appropriate) shown on the display device 1615. The computing system 1600 may also include other types of output devices 1613, such as a speaker, a printer, etc.

The various components of the computing system 1600 may be coupled together by one or more buses, which may include a power bus, a control signal bus, a status signal bus, a data bus, etc. For the sake of clarity, the various buses are illustrated in FIG. 16 as a bus system 1619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In an example, the term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method, comprising:
   determining that a hardware acceleration condition has been satisfied for a first function by:
      counting, within a time interval, a number of requests or instructions received by a function processing service to perform the first function; and
      determining that the number of requests or instructions to perform the first function exceeds a threshold value;
   configuring a hardware circuit to perform the first function;
   adding the first function to a function library that is implemented in the hardware circuit;
   receiving, at the function processing service, a request to execute source code, wherein the source code comprises the instructions to perform the first function; and
   causing the first function to be performed via the hardware circuit.

2. The computer-implemented method of claim 1, wherein:
   the hardware circuit comprises a field programmable gate array (FPGA); and
   the computer-implemented method further comprises translating the source code into hardware description language (HDL) code corresponding to the FPGA.

3. The computer-implemented method of claim 1, wherein:
   the hardware circuit comprises a graphics processing unit (GPU); and
   the computer-implemented method further comprises translating the source code into GPU code.

4. The computer-implemented method of claim 1, wherein:
   the hardware circuit comprises a programmable application-specific integrated circuit (ASIC); and
   the computer-implemented method further comprises using a custom compiler to translate the source code into machine code corresponding to the programmable ASIC.

5. The computer-implemented method of claim 1, wherein:
   the hardware circuit comprises a digital signal processor (DSP); and
   the computer-implemented method further comprises translating the source code into DSP code.

6. The computer-implemented method of claim 1, wherein determining that the hardware acceleration condition has been satisfied comprises:
   counting the number of requests to perform the first function that the function processing service receives within the time interval; and
   determining that the number of requests exceeds the threshold value.

7. The computer-implemented method of claim 1, wherein the first function belongs to a family of functions, and wherein determining that the hardware acceleration condition has been satisfied further comprises:
   counting a combined number of requests to perform any function within the family of functions that the function processing service receives within a time interval including the number of requests to perform the first function; and
   determining that the combined number of requests exceeds the threshold value.

8. The computer-implemented method of claim 1, wherein determining that the hardware acceleration condition has been satisfied further comprises:
   determining an estimated cost savings associated with performing the number of instructions of the first function via the hardware circuit compared to performing the first function via a general-purpose processor; and
   determining that the estimated cost savings exceed the threshold value.

9. The computer-implemented method of claim 1, further comprising configuring the hardware circuit to perform a second function in parallel with the first function, wherein the second function is different from the first function.

10. The computer-implemented method of claim 9, further comprising configuring the hardware circuit to operate a plurality of instances of the hardware circuit in parallel.

11. A system, comprising:
    at least one processor;
    memory in electronic communication with the at least one processor; and instructions stored in the memory, the instructions being executable by the at least one processor to perform operations of:
- determining that a hardware acceleration condition has been satisfied for a first function by:
  - counting, within a time interval, a number of requests or instructions received by a function processing service to perform the first function; and
  - determining that the number of requests or instructions to perform the first function exceeds a threshold value;
- configuring a hardware circuit to perform the first function;
- adding the first function to a function library that is implemented in the hardware circuit;
- receiving, at the function processing service, a request to execute source code, wherein the source code comprises the instructions to perform the first function; and
- causing the first function to be performed via the hardware circuit.

12. The system of claim 11, wherein:
the hardware circuit comprises a field programmable gate array (FPGA); and
the system further comprises translating the source code into hardware description language (HDL) code corresponding to the FPGA.

13. The system of claim 11, wherein:
the hardware circuit comprises a graphics processing unit (GPU); and
the system further comprises translating the source code into GPU code.

14. The system of claim 11, wherein:
the hardware circuit comprises a programmable application-specific integrated circuit (ASIC); and
the system further comprises using a custom compiler to translate the source code into machine code corresponding to the programmable ASIC.

15. The system of claim 11, wherein:
the hardware circuit comprises a digital signal processor (DSP); and
the system further comprises translating the source code into DSP code.

16. The system of claim 11, wherein determining that the hardware acceleration condition has been satisfied comprises:
- counting the number of requests to perform the first function that the function processing service receives within the time interval; and
- determining that the number of requests exceeds the threshold value.

17. The system of claim 11, wherein the first function belongs to a family of functions, and wherein determining that the hardware acceleration condition has been satisfied further comprises:
- counting a combined number of requests to perform any function within the family of functions that the function processing service receives within a time interval including the number of requests to perform the first function; and
- determining that the combined number of requests exceeds the threshold value.

18. The system of claim 11, further comprising instructions being executable by the at least one processor to configure the hardware circuit to perform a second function in parallel with the first function, wherein the second function is different from the first function.

19. A non-transitory computer-readable medium storing instructions thereon that, when executed by at least one processor, causes a computing device to:
- determine that a hardware acceleration condition has been satisfied for a first function by:
  - counting, within a time interval, a number of requests or instructions received by a function processing service to perform the first function; and
  - determining that the number of requests or instructions to perform the first function exceeds a threshold value;
- add the first function to a function library that is implemented in hardware circuits;
- receive, at a function processing service, a request to execute source code, wherein the source code comprises the instructions to perform the first function; and
- cause the first function to be performed via the hardware circuits.

20. The non-transitory computer-readable medium of claim 19, wherein the hardware circuits include one or more of a field programmable gate array (FPGA), a graphics processing unit (GPU), a programmable application specific integrated circuit (ASIC); or a digital signal processor (DSP).

\* \* \* \* \*